(12) United States Patent
Hughes et al.

(10) Patent No.: US 8,291,795 B2
(45) Date of Patent: Oct. 23, 2012

(54) FASTENER SYSTEM WITH STABLE ENGAGEMENT AND STICK FIT

(75) Inventors: Barry J. Hughes, Arden (GB); Gary Dilling, Gardner, MA (US)

(73) Assignee: Phillips Screw Company, Burlington, MA (US)

( * ) Notice: Subject to any disclaimer, the term of this patent is extended or adjusted under 35 U.S.C. 154(b) by 104 days.

(21) Appl. No.: 12/880,584

(22) Filed: Sep. 13, 2010

(65) Prior Publication Data

US 2011/0217143 A1 Sep. 8, 2011

Related U.S. Application Data

(60) Provisional application No. 61/309,655, filed on Mar. 2, 2010.

(51) Int. Cl.
*B25B 23/00* (2006.01)
*F16B 23/00* (2006.01)

(52) U.S. Cl. ............ 81/460; 411/404; 411/409; 411/410

(58) Field of Classification Search .................... 81/460, 81/186; 411/403–405, 408, 409
See application file for complete search history.

(56) References Cited

U.S. PATENT DOCUMENTS

| | | |
|---|---|---|
| 2,474,994 A | 7/1949 | Tomalis |
| RE24,878 E | 9/1960 | Smith et al. |
| 3,120,012 A | 2/1964 | Muenchinger |
| 3,237,506 A | 3/1966 | Muenchinger |
| 3,273,442 A * | 9/1966 | Launay ................... 411/403 |
| 3,584,667 A | 6/1971 | Reiland |
| 3,763,725 A | 10/1973 | Reiland |
| 4,084,478 A | 4/1978 | Simmons |
| 4,187,892 A | 2/1980 | Simmons |
| 4,269,246 A | 5/1981 | Larson et al. |
| 4,457,654 A | 7/1984 | Sygnator |
| 5,019,080 A | 5/1991 | Hemer |
| 5,219,253 A * | 6/1993 | Shinjo ................... 411/403 |
| 5,277,531 A * | 1/1994 | Krivec ................... 411/403 |
| 5,435,680 A * | 7/1995 | Schuster ................. 411/404 |
| 5,461,952 A | 10/1995 | Goss |
| 5,553,983 A * | 9/1996 | Shinjo ................... 411/404 |
| 5,577,871 A | 11/1996 | Brugola |
| 5,957,645 A | 9/1999 | Stacy |
| 6,131,493 A | 10/2000 | Yamamoto et al. |
| 6,199,455 B1 | 3/2001 | Wagner |
| 6,626,067 B1 * | 9/2003 | Iwinski et al. ............ 81/121.1 |
| 6,951,158 B1 * | 10/2005 | Edland .................... 81/460 |
| 7,073,416 B2 * | 7/2006 | Kozak et al. .............. 81/460 |
| 7,225,710 B2 * | 6/2007 | Pacheco, Jr. ............. 81/460 |
| 7,293,949 B2 | 11/2007 | Dilling |
| 7,437,975 B1 * | 10/2008 | De Anfrasio ............. 81/121.1 |
| 7,690,282 B2 * | 4/2010 | Griffiths .................. 81/460 |
| 7,730,812 B2 * | 6/2010 | Edland .................... 81/436 |
| 7,891,274 B2 * | 2/2011 | Dilling ................... 81/436 |

(Continued)

FOREIGN PATENT DOCUMENTS

GB 2 149 872 A 6/1985

*Primary Examiner* — David B Thomas
(74) *Attorney, Agent, or Firm* — Dickstein Shapiro LLP

(57) ABSTRACT

Various embodiments described herein provide a fastener system having straight walled driving surfaces that provides a reliable stick fit feature, while also improving stability of engagement between the system components. A feature of the new system is to allow engagement of existing standard straight walled drivers in the new system.

73 Claims, 16 Drawing Sheets

U.S. PATENT DOCUMENTS

| | | |
|---|---|---|
| 2003/0053887 A1 | 3/2003 | Brooks |
| 2006/0266168 A1 | 11/2006 | Pacheco, Jr. |
| 2007/0028728 A1* | 2/2007 | Griffiths .......................... 81/460 |
| 2007/0245863 A1* | 10/2007 | Edland ............................. 81/460 |
| 2009/0074536 A1* | 3/2009 | Dilling ........................ 411/404 |
| 2009/0104002 A1* | 4/2009 | Dilling ............................. 81/460 |

* cited by examiner

FASTENER SYSTEM WITH STABLE ENGAGEMENT AND STICK FIT

CROSS-REFERENCE TO RELATED APPLICATIONS

This application claims the benefit of U.S. provisional application 61/309,655, filed on Mar. 2, 2010, the subject matter of which is incorporated by reference herein in its entirety.

BACKGROUND

This application relates in general to drive systems for threaded fasteners, tools for their manufacture, and drivers for applying torque to such fasteners. More specifically this application relates to fasteners that are constructed with straight walled recesses. In particular a fastener system is constructed wherein the driver and fastener engage with improved stability of axial alignment and stick fit.

Threaded fasteners commonly used in industrial applications typically are driven by power tools at high speeds and under high torque loads. Such conditions present difficult design considerations, particularly with respect to the drive systems and, more particularly, with threaded fasteners having a driver engageable recess in the fastener head or a driver engageable exterior contour to the fastener head. Ideally, such a drive system needs to be easily manufactured, both as to recess and head geometry, as well as to associated tooling for forming the fastener head and the drivers for engaging the recess or head geometry. The strength of the head of the fastener should not be adversely affected by the recess. The driver, when mated, should distribute the stress loads uniformly to avoid formation of highly localized regions of stress that might result in deformation of the drive surfaces, or driver, or both, leading to premature failure of the drive system.

The fastener system should resist cam-out of the driver from the recess when the fastener is driven. In many applications, it is very important that the fastener must be capable of withstanding several cycles, as in applications where the fasteners must be removed in order to repair or replace parts or to remove and replace access panels. The fastener drive system ideally should be capable of such repeated cycling, particularly in environments where the recess may become contaminated, painted, corroded or otherwise adversely affected in use. In such environments, it is essential that the drive system maintain driving engagement while applying torque in a removal direction. It may be necessary for the drive system to be capable of applying even higher levels of torque when removing the fastener, as may occur when the fastener is over-tightened during initial assembly, or where corrosion develops at the interface at the engaged threads, or if thermal cycling of the assembled components has placed increased stress on the fastener. These, and other, characteristics often present competing considerations; and compromises of one in favor of another may have to be made.

A variety of recess and driver configurations are in common use, including a number of cross-recesses, such as those described in U.S. Pat. Re. 24,878 (Smith et al.); U.S. Pat. No. 3,237,506 (Muenchinger) and U.S. Pat. No. 2,474,994 (Tomalis). Other fastener geometries include multi-lobe geometries of the type described in U.S. Pat. No. 3,763,725 (Reiland) and ribbed drive systems as described in U.S. Pat. No. 4,187,892 (Simmons). Also among the common recess configurations is the "Allen" system which is essentially a straight walled hexagonally shaped socket receptive to a similarly shaped driver. A fastener system having multiple lobes with spirally configured drive surfaces is described in U.S. Pat. No. 5,957,645 (Stacy).

With the exception of the ribbed systems, the walls and faces of the driver and recess typically are designed to fit closely with each other in an effort to achieve face-to-face contact of the driving and driven surfaces. With cross-recess fasteners, such face-to-face engagement can occur only, if at all, when the driver is properly aligned and seated within the recess. As a practical matter, however, in order to enable the driver to be inserted into the recess, there necessarily must be some clearance between the two.

The necessity for such clearance is even more critical with recesses having substantially axially aligned (straight) drive walls, as in the Reiland '725 patent and Allen head systems. In all of these systems, the practical result of the necessity for such clearance is that substantial face-to-face, broad area contact between the driver and recess surfaces is seldom achieved, if at all. With most drive systems for threaded fasteners, the driver mates with the recess in the head in a manner that results in point or line contact rather than face-to-face broad area contact. The actual area of contact typically is substantially less than full face-to-face contact. Consequently, when torque is applied by the driver, the forces applied to the screw head tend to be concentrated in localized areas with resulting high localized stresses and unstable axial alignment. Such localized high stress can plastically deform the recess, forming ramps or other deformations that result in premature, unintended disengagement of the driver from the recess.

A fastener system for maximizing the engageable surface area between the driver and drive surfaces is described in the Stacy '645 patent, which is commonly owned with the subject application. The disclosure of the '645 patent is incorporated in this application by reference. The recess and driver of the '645 patent are constructed with spirally configured engaging surfaces that are substantially aligned parallel with the axis of the fastener and may be classified generically as a straight walled fastener system. A more robust embodiment of the spiral drive fastener system is described in U.S. patent application publication 2009-0104002 (Dilling), commonly owned with the subject application. The disclosure of the Dilling application is also incorporated herein by reference.

The advantages of the invention described in the '645 patent are achieved by configuring the driving and driven surfaces of the driver and fastener, respectively, to conform to a segment of a spiral and, particularly, in a spiral configuration that enables a substantial and generous clearance between the driver and the recess during insertion and removal of the driver, but in which the fully seated driver is permitted to rotate to take up that clearance. The spiral configurations of the drive walls of the driver and the driver-engageable walls of the recess are such that when the spiral walls engage, they do so over a relatively broad area thereby applying and distributing the stress over that broad area. The spirally configured driving and driven walls are oriented to direct a major portion of the applied torque substantially normal to the fastener radius with little, if any, reliance on frictional, near-tangential engagement.

Another example of a straight walled fastener system is the system described in U.S. Pat. No. 3,584,667, issued to Reiland. This reference is incorporated herein by reference. The Reiland '667 patent describes a fastener system in which the driving surface geometries consist of a series of semi-cylindrical surfaces arranged substantially in the shape of a hexagon. The Reiland fastener systems are generically referred to as hex-lobular and have driving surfaces that are parallel with the axis of the fastener.

Although straight walled fasteners are in successful general use in many applications, they may experience difficulties resulting from axially misalignment between driver and fastener. In addition it has been difficult to obtain a reliable friction engagement that provides a stick fit feature. A stick fit feature is desired to hold the fastener on the driver in alignment, while the installation of the fastener is initiated. This is especially useful in high volume assembly line operations that use power driven bits to apply torque to the fastener. Axial alignment and stick fit are also important as the fastener length is extended.

In many applications in which a straight walled drive system is used, the driver may be power driven or required to be inserted in locations of limited access. In such situations, there is a need to releasably engage the fastener on the driver in advance of installation so that the driver can be used as an insertion tool, as well as a driver. This "stick fit" feature has been attempted in several different types of fasteners, for example, in fastener/driver systems having a cruciform (cross, shaped geometry), several are shown in U.S. Pat. Nos. 6,199,455 and 4,457,654. A fastener system having a square drive geometry is illustrated in U.S. Pat. No. 4,084,478. It is observed that the stick fit efforts focus on the drive surfaces.

The "stick fit" feature allows the fastener to be releasably engaged on the driver to enable manipulation of the driver and fastener as a unit in hard to reach, automated, and other applications. Once installed, the fastener and driver may be disengaged with minimal effort.

The reference Larson, U.S. Pat. No. 4,269,246 is of interest in that it employs a partially tapered driver to enhance engagement. In Larson, the internal radius of the driver flutes are disposed parallel to the axis of the driver while the crest of the lobe is tapered inward toward the tip. The expressed purpose of this is to avoid premature interference between bit and recess. It is observed that the configuration results in a line contact between driver and recess both circumferentially and axially and will not enhance stability or frictional engagement. Only the bit is tapered with no change to the recess geometry.

Also of interest is the reference Goss, U.S. Pat. No. 5,461,952. In Goss a trailing side wall of the driver is tapered to provide a gradually thickening lobe geometry that generates a friction engagement on a drive surface. Since only one side wall is tapered the engagement with the straight sided drive surface becomes a circumferential line contact. Again only the bit is reconfigured. This is because there is a reluctance to alter the recess geometry as it would result in a loss of compatibility with existing drivers. Backward compatibility is a design advantage in any of the fastener systems, in particular straight walled systems.

A fastener system configured to provide stick fit in a straight walled fastener is described in the reference Dilling, U.S. Pat. No. 7,293,949, commonly owned with this application. In Dilling interference surfaces are constructed on inner non-driving transition surfaces between the wings of the fastener recess. It has been found that an improved stick fit feature may be obtained using a standard driver for this type of fastener system, using the interference surface on the so called "B" dimension of the recess.

SUMMARY

Various embodiments described herein provide a fastener system having straight walled driving surfaces that provides a reliable stick fit feature, while also improving stability of engagement between the system components. An important feature of the new system is to allow engagement of existing standard straight walled drivers in the new system. In order to accomplish this goal, a new driver and recess system is constructed as described below.

The straight walled fastener systems of this application are generally constructed with a recess having multiple wings extending radially outward from a central axis and a driver having matching multiple lobes that mate with the wings of the recess. Each of the wings and lobes have drive surfaces consisting of an installation surface and a removal surface depending on the direction of torque applied. These drive surfaces are constructed substantially in a parallel aligned relation to the central axis of the fastener system. Adjacent wings or lobes are separated at the outer radius by a non-driving transition surfaces. The diameter formed by the outer radius will be referred to herein as the "A" dimension, as shown in the figures.

To generate an interference fit and provide stick fit, a substantially flat interference contour is formed on the "A" dimension surface of the driver lobes and a mating interference contour is formed on the opposing "A" dimension surface of the recess wings. The recess is enlarged relative to the standard straight walled recess to provide room for engagement of a standard straight walled driver without interference with the recess wing interference contour. The artisan will understand that reference herein to a "standard" driver and recess refers to the prevailing industry accepted sizes in the relevant market. It should be noted that the stick fit and alignment advantage is not obtained when a standard driver is used to engage the fastener, but backwards capability is provided in this manner, so as to allow the use of a standard driver in the recess of this application.

To form the mating interface of the driver and fastener, the driver lobe interference surface and the recess wing interference surface are tapered inward. The interface tapers radially outward from the bottom of the recess to a distance slightly below the height of the recess. The interference contours may be substantially flat to maximize the surface to surface engagement. However, to facilitate construction, these contours will have a slight curvature with a relatively large radius to allow a turning process to be used.

In this manner, stick fit is provided, while stability of the engagement of driver and recess is enhanced. In addition, by enlarging the dimensions slightly, relative to a standard recess of a straight walled fastener system, the use of a standard driver is allowed. However, as indicated above there will be no stick fit engagement, when using a standard driver.

In one embodiment of this application, the straight walled fastener system is configured with the drive surface geometry of a hex-lobular fastener system, as described in the reference Reiland, cited above.

In another embodiment of this application, the straight walled fastener system is configured having a drive surface geometry of a spiral, as described in the reference Stacy, cited above.

In another embodiment of this application, the straight walled fastener system is configured having a drive surface geometry of a spiral, as described in the published application of Dilling, cited above.

In another embodiment of this application, the fastener is constructed having externally accessed driver surfaces and the driver is constructed with a mating socket.

In another aspect of the invention a punch is provided for forming a recess in the head of a fastener blank in which the punch includes a main body having an end contoured to form a portion of the fastener head and a nib adapted to form the recess of the invention in a conventional two-blow header technique. The radial extending wings of the nib may include one or two spiral surfaces adapted to form complementary surfaces when impacted against the head end of the fastener.

These and other features and advantages of the invention will be more clearly understood from the following detailed description and drawing of embodiments of the present application.

DETAILED DESCRIPTION OF PREFERRED EMBODIMENTS

Figure 1:
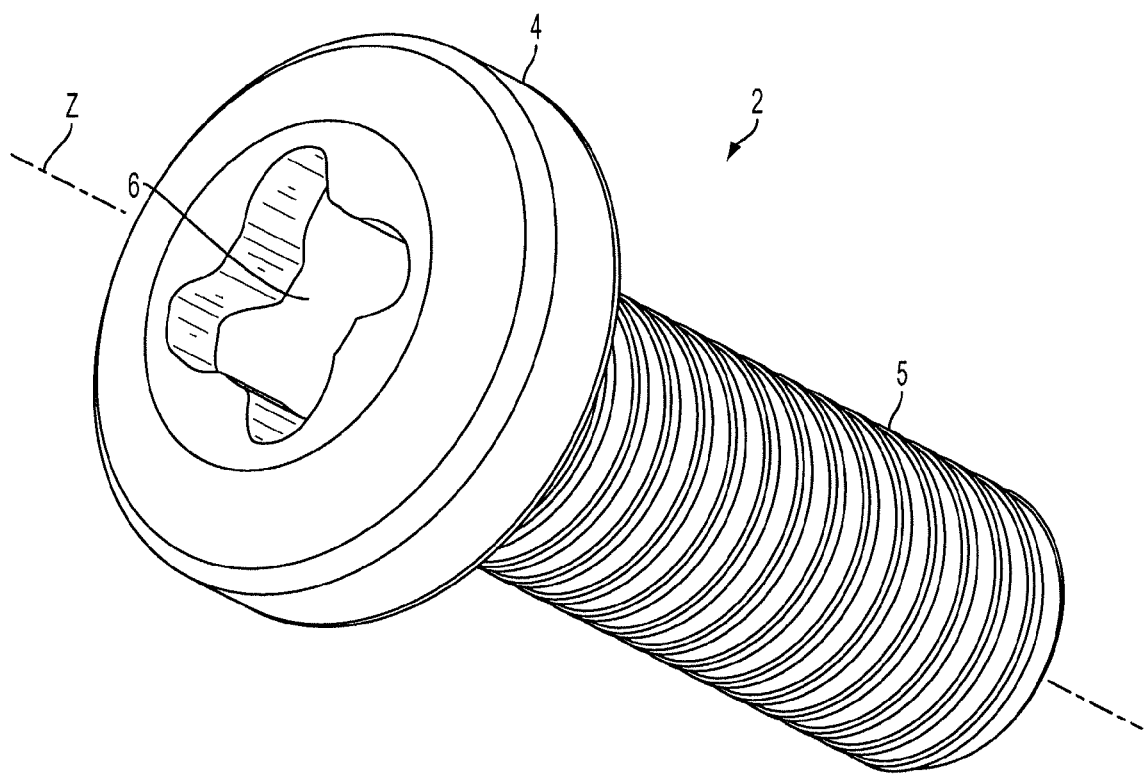
FIG. 1 is perspective view of a fastener having a spirally configured drive surfaces, according to the prior art.

Although the present invention will be described with reference to the embodiments shown in the drawings, it should be understood that the present invention may have alternate forms. In addition, any suitable size, shape or type of elements or materials could be used.

FIG. 1 illustrates an example of a threaded fastener having straight walled drive surfaces of the prior art. The term "straight walled drive surfaces" is used herein to refer to fastener systems in which the driving surfaces are substantially in alignment, i.e. parallel with the longitudinal axis of the fastener. It is accepted in the fastener industry that statements, such as "parallel alignment" are subject to some deviation tolerances, as it is understood that such alignment is subject to manufacturing tolerances and may vary slightly in actual practice. In particular, FIG. 1 illustrates fasteners as described in the published application to Dilling referenced above. In general, fastener systems of this type are constructed having a fastener 2 and a mating driver bit (not shown). The fastener 2 is constructed having a head 4 and a threaded shank 5. In this example, a spirally configured recess 6 is formed in the head 4 with drive surfaces aligned in parallel with the axis z of the fastener 2 (straight walled). A driver bit is constructed having spirally configured drive surfaces that mate with the corresponding surfaces of the fastener recess 6. The head 4 may be formed in a conventional two-blow header machine in which the end of the wire or other material from which the fastener is made is supported in a die of the header machine and its head end is impacted, first with a punch that partially forms the head, and then with a finishing punch that finishes the head and forms the driver-engageable recess. The general construction of fasteners is well known and will not be described further in this application. An assortment of such well known methods can be used to construct the subject fastener system.

Fasteners are constructed in many different configurations and the application of the subject matter of this application is not intended to be limited to any particular type. For example, some fasteners do not have heads that clamp the work piece to the substrate. They may use a second threaded section to engage the work piece, instead. Whereas the illustrated fasteners have clamping heads, the advantages provided by the configurations illustrated may be obtained in other fastener types such as non-clamping fasteners and others.

Figure 2:
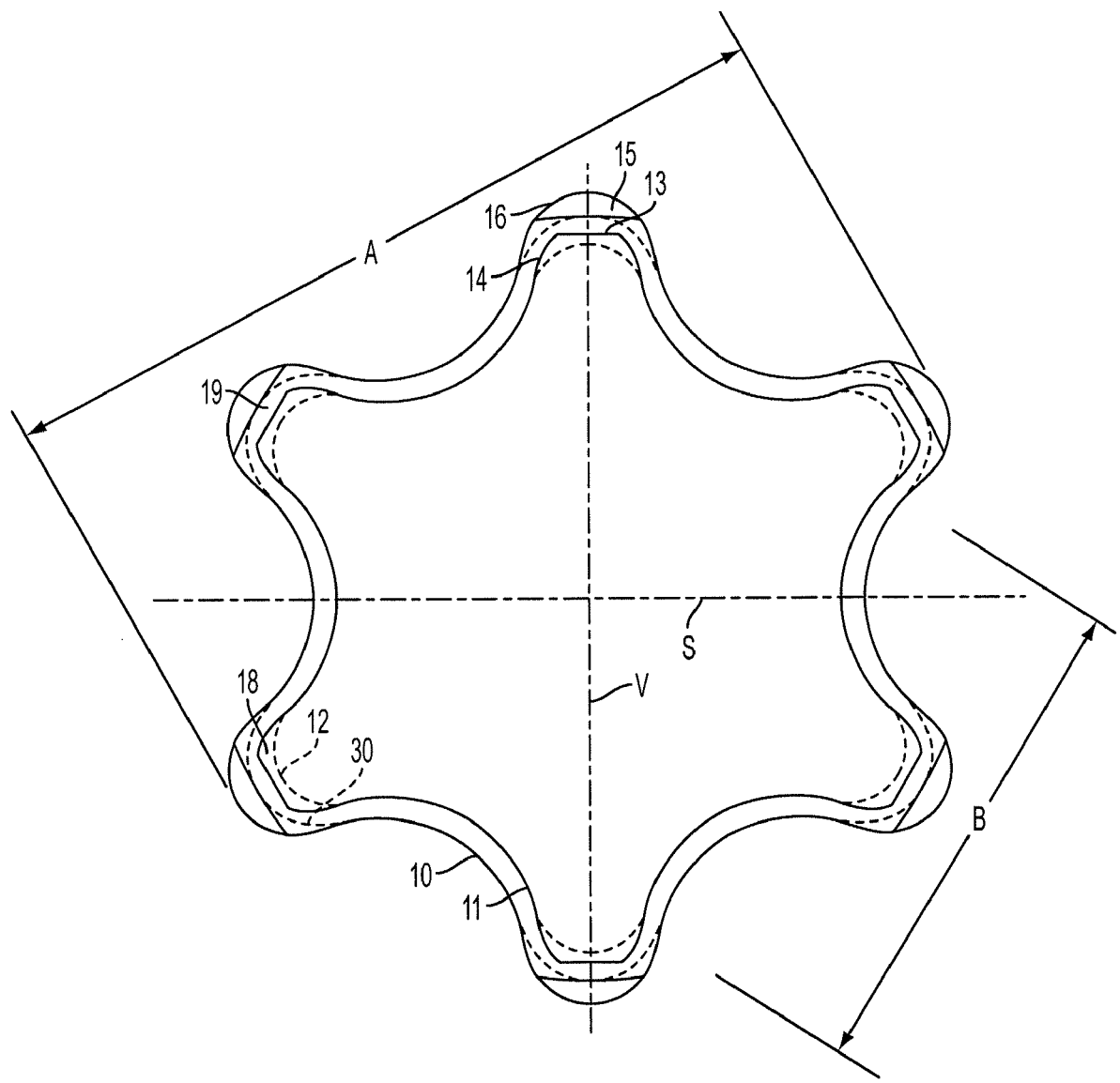
FIG. 2 is a schematic view of the engagement geometries of a hex-lobular drive system constructed according to a first embodiment.

The features of a first embodiment are shown in FIG. 2 in which the profile geometries of a recess 10, a special driver 11, and a standard driver 12 are shown in the engaged relationship. For illustration, the Cartesian axes V and S perpendicular to the central longitudinal axis are shown in FIG. 2 and other figures. The contour of the standard driver 12 is shown in FIG. 2 in dotted lines where it differs from the contour of the special driver 11. Although, in this particular illustration, the geometry is similar to the hex-lobular type fastener systems of the Reiland reference cited above, it is intended only as an example of the use of the subject invention in a straight walled fastener system. FIG. 2 is, of course, not intended to indicate that both drivers may be used at the same time, but only to illustrate the relative position of the special driver and standard driver when engaged in the fastener recess. The clearances are exaggerated for purposes of illustration. There will be no clearance at the interface 19 between the special driver and recess. The frictional engagement will occur slightly inward of the top 27 of the fastener recess 10.

As shown in FIG. 2, the driver 11 is constructed with an interference contour 13 formed on the "A" dimension surface of the driver lobes 14. Fastener recess 10 is constructed with a mating interference contour 15 formed on the opposing "A" dimension surface of the recess wings 16. The recess is enlarged relative to a standard hex lobular recess (not shown) to provide a sufficient clearance 18 for a standard hex lobular driver 12 to be received in the recess 10 without interference with the recess wing interference contour 15. In one embodiment, only the "A" dimension contour is enlarged, while the "B" dimension contour is held to the standard recess size for a fastener of the type illustrated in FIG. 2. This improves the stability of the alignment of both the special driver and the standard driver. The geometry of a standard recess 30 is shown according to the embodiment in which only the "A" dimension is expanded. The contour of the standard recess 30 is shown in FIG. 2 in dotted lines where it differs from the contour of the special recess 10. When engaged, the driver 11 and the recess 10 form an interface 19 between the driver lobe interference surface 13 and the fastener wing interference surface 15. It should be noted that the interface surfaces 13 and 15, thus formed, are non-driving surfaces.

The interference surfaces 13 and 15 are constructed to provide a significant surface to surface engagement at an interface 19. The contours are matching to further facilitate this engagement. In the construction of the interference contours, a machining process will be performed by which a slight curvature will be formed. Because of the large radius of curvature used in the preferred embodiment, these contours may be considered "substantially flat, however, the interface contours may be more curved and still accomplish the advantages of the subject fastener system.

Figure 3:
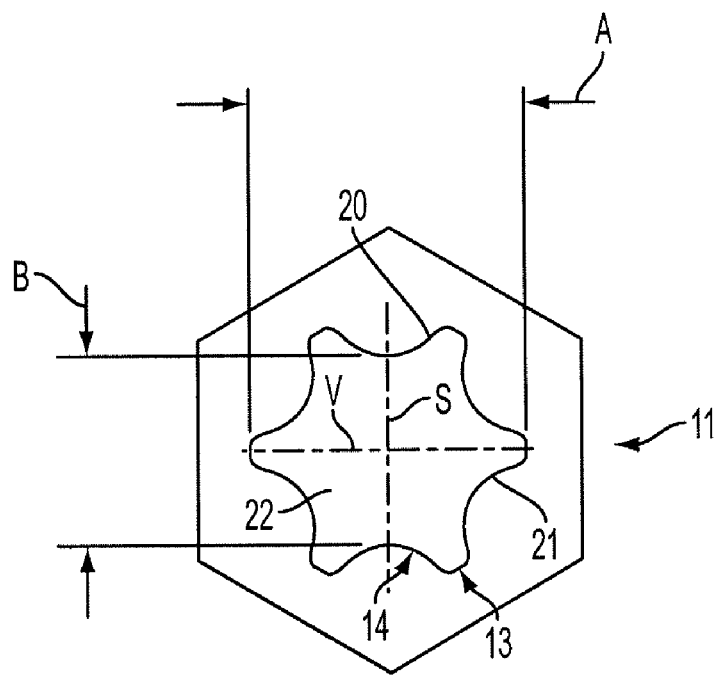
FIG. 3 is a top view of a driver configured to drive the fastener of FIG. 2.
Figure 4:
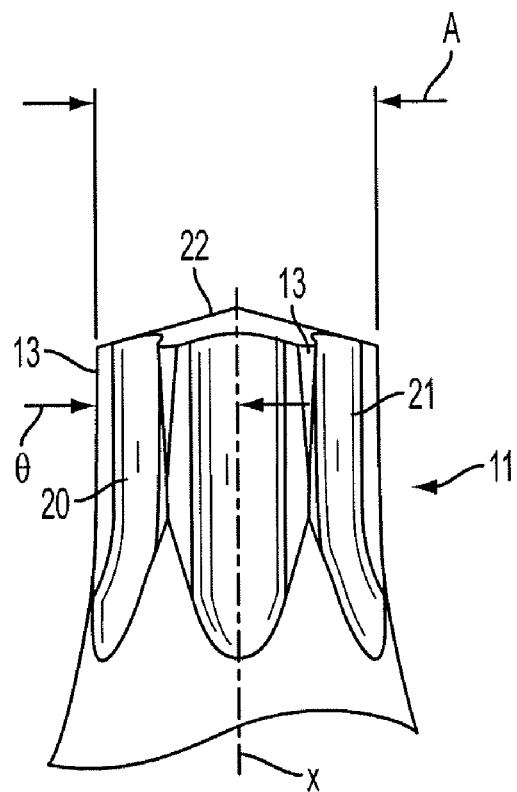
FIG. 4 is a side view of the driver of FIG. 2.

The details of the improved driver 11 of FIG. 2 are shown in FIGS. 3 and 4 with like reference numerals identifying like elements. A driver 11 is constructed, as indicated above, having an interference contour 13 formed at the crest of each lobe 14 at the "A" dimension of the driver geometry. These surfaces are non-driving surfaces that provide a transition contour between the installation and removal driving surfaces 20 and 21 respectively. The interference contour 13 gradually tapers inward, towards a tip 22 of the driver 11, at an angle θ to the central longitudinal axis x of the driver 11. The angle θ preferably may be in the range of about 1° to about 3° depending on the angle of the recess interference surface (or wedge) 15.

Figure 5:
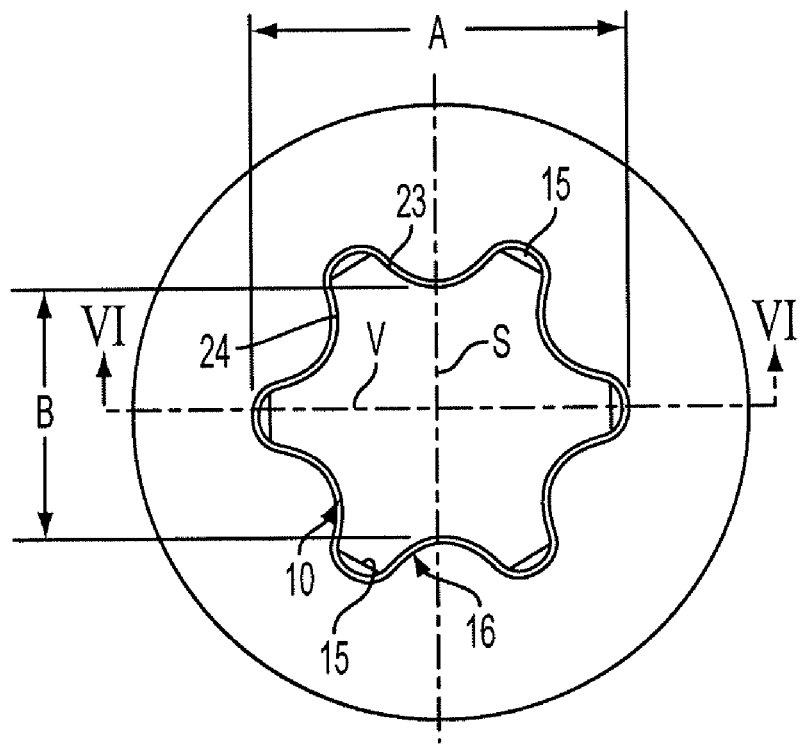
FIG. 5 is a top view of a fastener having a recess according to the embodiment of FIG. 2.
Figure 6:
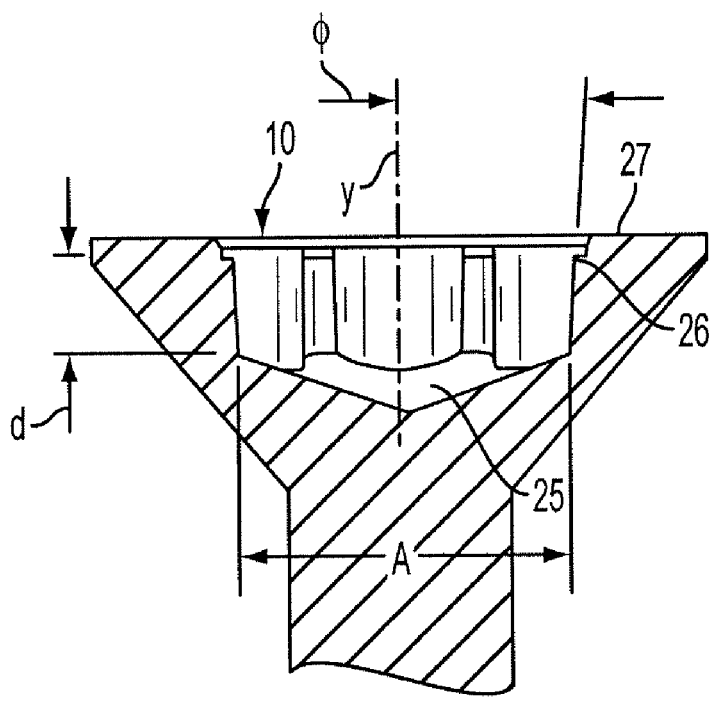
FIG. 6 is a taken along section line VI-VI of FIG. 5.
Figure 7:
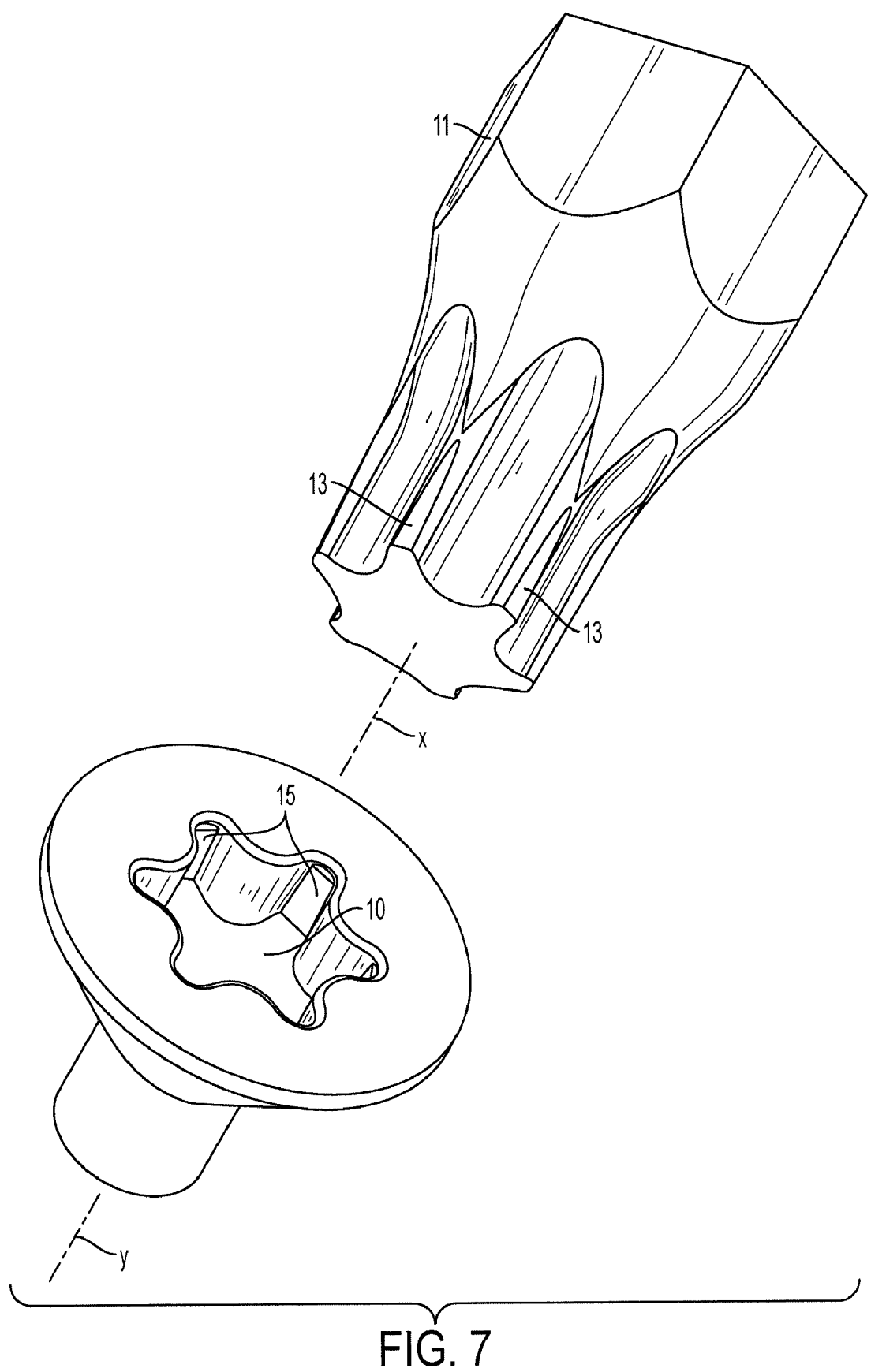
FIG. 7 is a perspective view of the special driver and fastener of FIG. 2.

As shown in FIGS. 5 and 6, the recess 10 is constructed in the top surface 27 of the fastener having a mating interference contour 15 located at the opposing "A" dimension of each of the wings 16 of the recess 10. These surfaces are non-driving surfaces that provide a transition contour between the installation and removal driving surfaces 23 and 24 respectively. The recess wing interference contour 15 gradually tapers inward (towards the central longitudinal axis y), towards the bottom 25 of the recess 10. The interference contour 15 begins at a point 26 slightly below the top 27 of the recess 10 and continues for a depth d, which for small angles approximates the taper length. This provides a small clearance between the driver 11 and the recess 10 upon initial insertion. The interference contour 15 tapers inward at an angle Φ to the central longitudinal axis y of the fastener. The angle Φ preferably may be in the range of about one degree (1°) to about three degrees (3°) depending on the angle of the driver lobe interference contour 13.

To insure the establishment of an effective stick fit feature, the interference contours 13 and 15 are tapered inward, from top to bottom relative to the recess, at angles preferably in the range of about one degree (1°) to about three degrees (3°), however, it has been found that the angles Φ and θ should not be exactly the same, but the angle θ should be slightly larger than the angle Φ. Preferably, the difference between the angle θ and the angle Φ is from about one quarter degree (0.25°) to about three quarters degree (0.75°) and more preferably about one half degree (0.5°). Depending on the size of the screws and thus the depth of its recess, it may be desirable to make the angle θ and the angle Φ larger or smaller. For size one to size three recesses and drivers currently prevalent in the building supply market, about three degrees (3°) is preferable. For larger size drivers and recesses, about four degrees (4°) may be more preferable. And as the screw recess and driver sizes get larger, larger angles may be preferable. For standard recess and driver sizes in the building supply market, the angle θ and the angle Φ of from about one half degree (0.5°).to about seven degrees (7°) is preferable. The taper length gets shorter as the angle gets bigger. It is advantageous to taper in or out across the "A" dimension about ten percent (10%) of the depth d of the taper length As an example, an angle Φ of one and one half degrees (1.5°) and an angle θ of two degrees (2°) would provide an effective interference. Stick fit can also be reliably constructed during manufacturing by maintaining the driver "A" dimension within a positive tolerance of, for example, plus zero (+0) to plus two thousandths (+0.002) inch, while forming the "A" dimension of the recess with a negative tolerance of, for example minus zero (−0) to minus two thousandths (−0.002) inch. As another example, one can specify the geometry tolerances as follows: for the recess angle Φ, plus one quarter degree (+0.25°), minus zero degree (−0.0°); and for the driver angle θ, plus zero degree (+0.0°), minus one quarter degree (−0.25°). The interface tapers radially outward from the bottom of the recess to a distance slightly below the height of the recess. To facilitate a stick fit engagement of the driver and recess, the taper angle θ of the driver lobe interference contours may be constructed slightly larger than the taper angle Φ of the recess wing interference contours, as indicated above.

Figure 8:
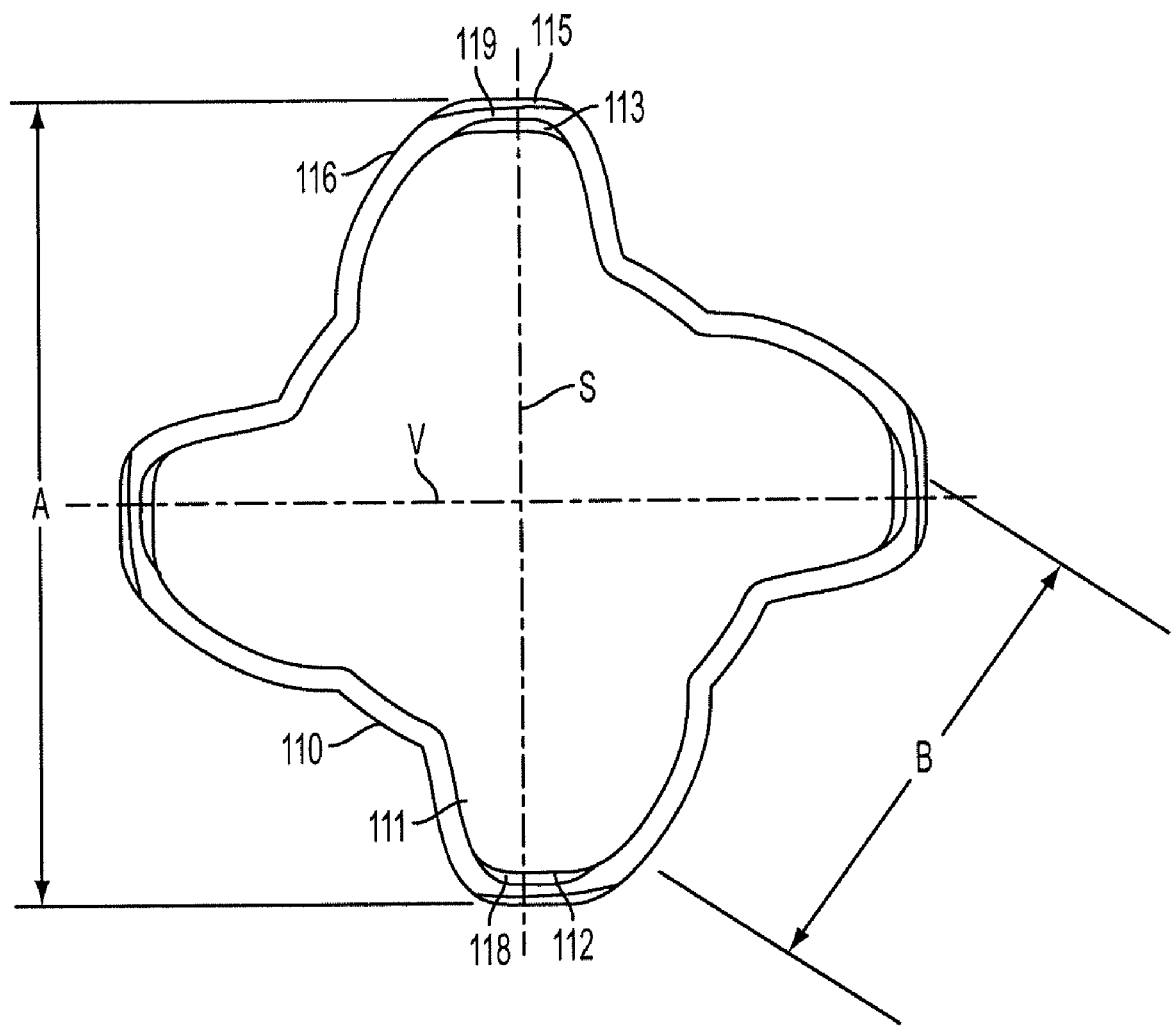
FIG. 8 is a schematic view of the engagement geometries of a spiral drive system constructed according to a second embodiment.

The profile geometries of another embodiment are illustrated in FIG. 8. In FIG. 8, a recess 110 is shown having a straight walled driver surfaces with spiral contours. A special driver 111, and a standard driver 112 are shown in the engaged relationship. The clearances are exaggerated for purposes of illustration. Similarly to the first embodiment, there will be no clearance at the interface 119 between the special driver 111 and the recess 110. The frictional engagement will occur slightly inward of the top of the fastener recess 110

As shown in FIG. 8, the driver 111 is constructed with an interference contour 113 formed on the "A" dimension surface of the driver lobes 114. The fastener recess 110 is constructed with a matching interference contour 115 formed on the opposing "A" dimension surface of the recess wings 116. The recess is enlarged relative to a standard hex lobular recess (not shown, but similar to that shown for the embodiment of FIG. 2) to provide a sufficient clearance 118 for the standard spiral driver 112 to be received in the recess 110 without interference with the recess wing interference contour 115. In one embodiment, only the "A" dimension contour is enlarged, while the "B" dimension contour is held to the standard recess size for a fastener of the type illustrated in FIG. 8. When engaged, the driver 111 and the recess 110 form an interface 119 between the interference contours 113 and 115 respectively. It should be noted that the interface surfaces 113 and 115, thus formed, are non-driving surfaces.

The interference contours 113 and 115 are constructed to provide a significant surface to surface engagement at the interface 119. The contours are matching to further facilitate this engagement. In the construction of the interference contours, a machining process will be performed by which a slight curvature will be formed. Because of the large radius of curvature used in the preferred embodiment, these contours may be considered "substantially flat, however, the interface contours may be more curved and still accomplish the advantages of the subject fastener system.

Figure 9:
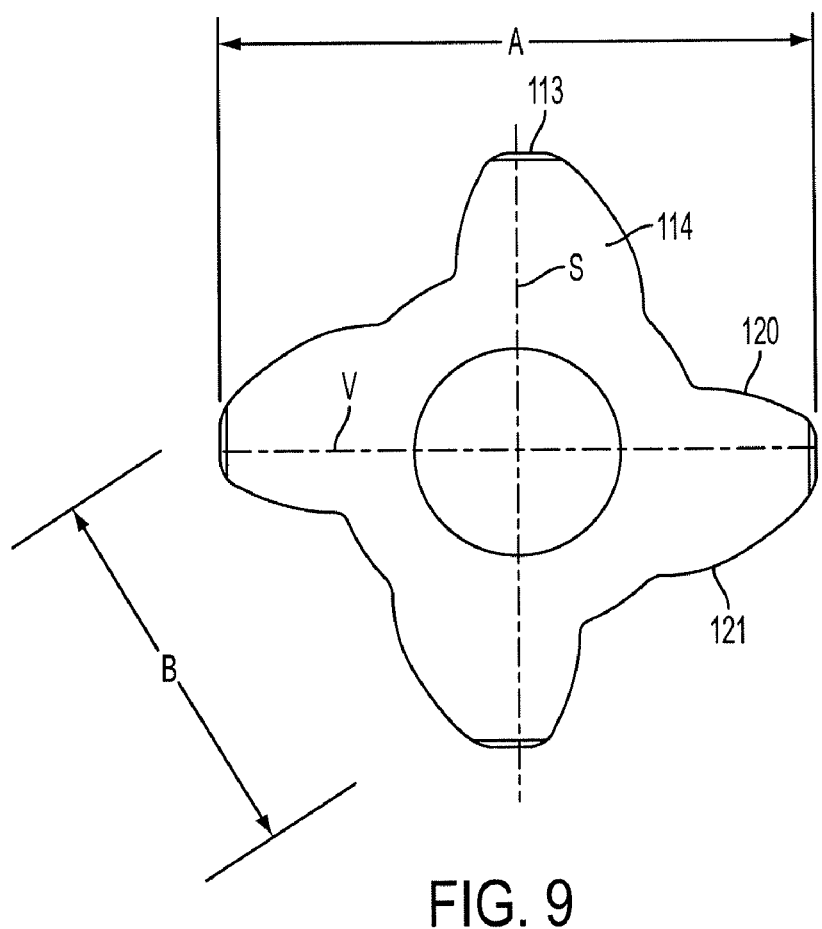
FIG. 9 is a top view of a driver configured to drive the fastener of FIG. 8.
Figure 10:
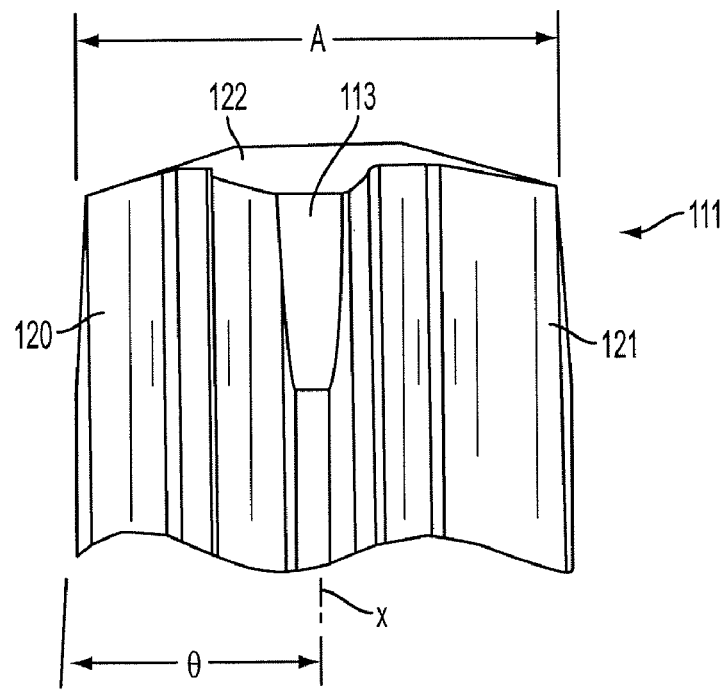
FIG. 10 is a side view of the driver of FIG. 8.
Figure 11:
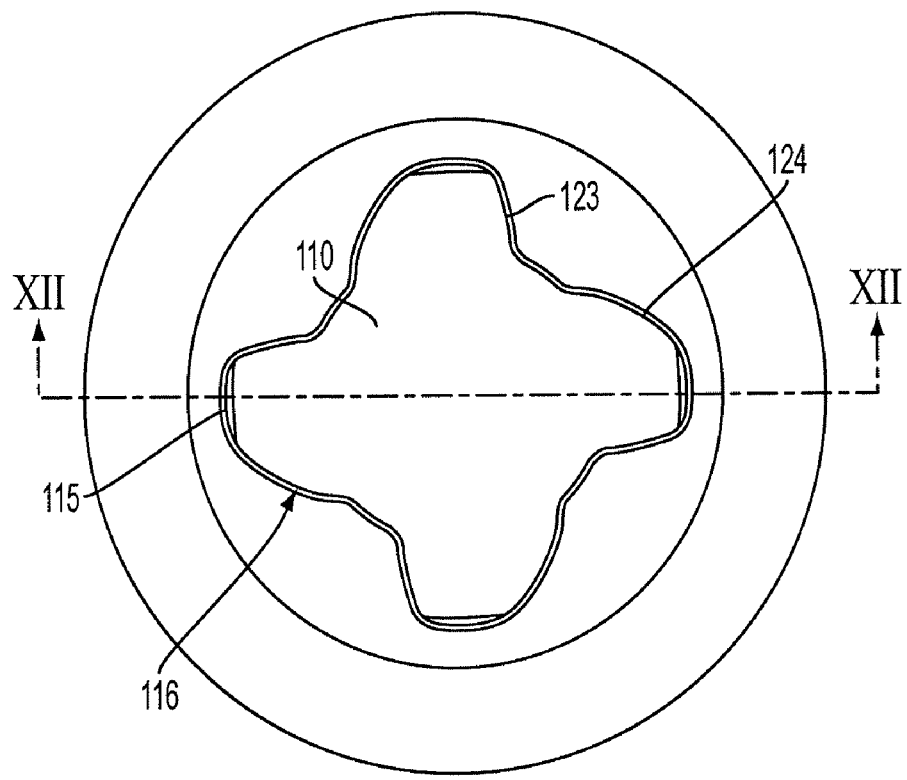
FIG. 11 is a top view of a fastener having a recess according to the embodiment of FIG. 8.
Figure 12:
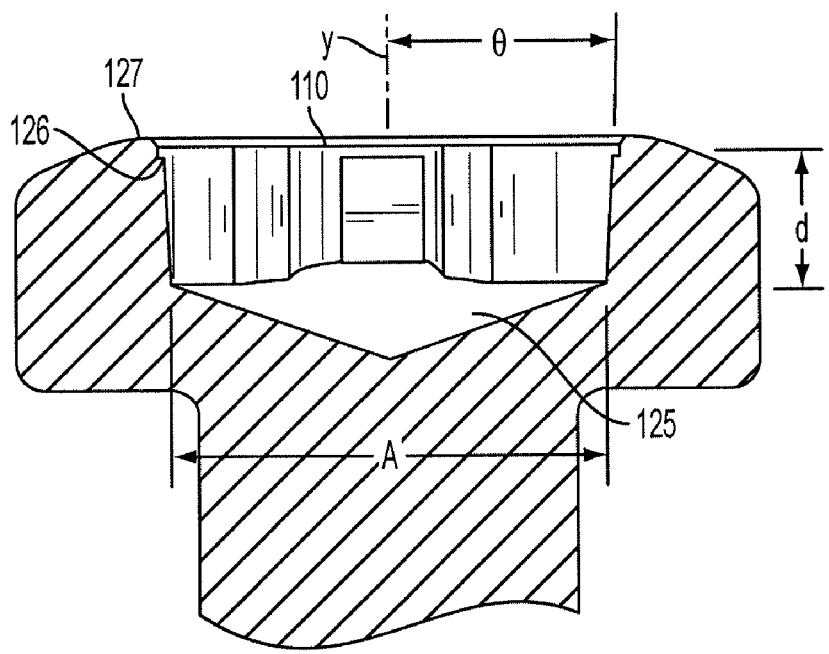
FIG. 12 is a view taken along section line XII-XII of FIG. 11.
Figure 13:
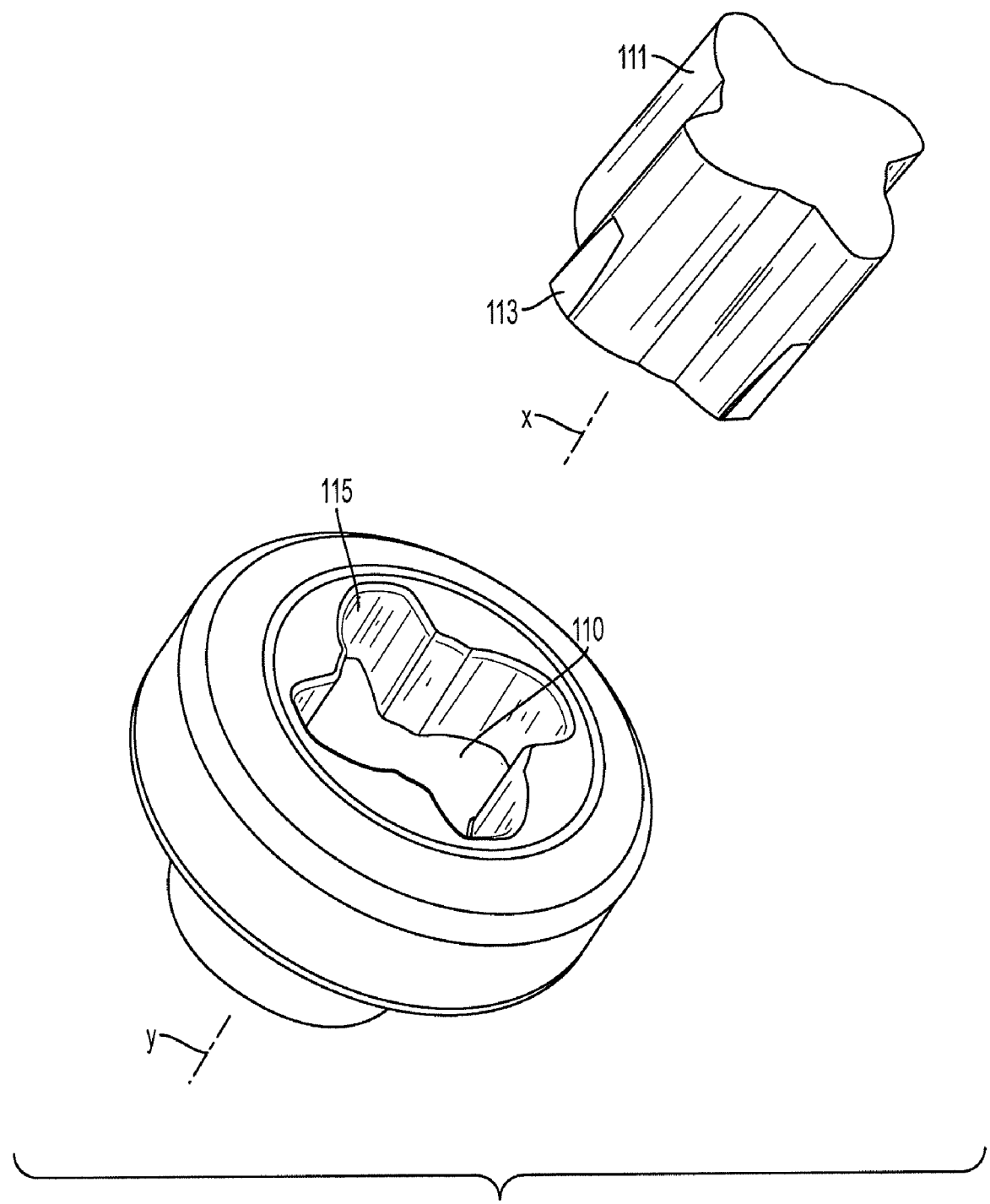
FIG. 13 is a perspective view of the special driver and fastener of FIG. 8.

The details of the improved driver 111 of FIG. 8 are shown in FIGS. 9 and 10 with like reference numerals identifying like elements. The driver 111 is constructed, as indicated above, having an interference contour 113 formed at the crest of each lobe 114 at the "A" dimension of the driver geometry. These surfaces are non-driving surfaces that provide a transition contour between the installation and removal surfaces 120 and 121 respectively. The interference contour 113 gradually tapers inward, towards the tip 122 of the driver 111, at an angle θ to the longitudinal axis x of the driver 111. The angle θ, preferably may be in the range of about one degree (1°) to about three degrees (3°) depending on the angle of the recess wing interference contour 115.

As shown in FIG. 10, the recess 110 is constructed in the top surface 127 of the fastener having a matching interference contour 115 located at the opposing "A" dimension of each of the wings 116 of the recess 110. These surfaces are non-driving surfaces that provide a transition contour between the installation and removal driving surfaces 123 and 124 respectively. The interference contour 115 gradually tapers inward (towards the axis y) towards the bottom 125 of the recess 110. The interference contour 115 begins at a point 126 slightly below the top 127 of the recess 110 and continues for a depth d. This provides a small clearance between the driver 111 and the recess 110 upon initial insertion. The interference contour 115 tapers inward at an angle Φ to longitudinal axis y of the fastener. The angle Φ preferably may be in the range of about one degree (1°) to about three degrees (3°) depending on the angle of the driver interference contour 113.

To insure the establishment of an effective stick fit feature in this embodiment, the interface contours 113 and 115 are tapered inward from top to bottom, relative to the recess, at angles preferably in the range of about one degree (1°) to about three degrees (3°), however, it has been found that the angles Φ and θ should not be exactly the same, but the angle θ should be slightly larger than the angle Φ. As an example, an angle Φ of one and one half degrees (1.5°) and an angle θ' of two degrees (2°) would provide an effective interference. Stick fit can also be reliably constructed during manufacturing by maintaining the driver "A" dimension within a positive tolerance of, for example plus zero (+0) to plus two thousandths (+0.002) inch, while forming the "A" dimension of the recess with a negative tolerance of, for example minus zero (−0) to minus two thousandths (−0.002) inch. The interface tapers radially outward from the bottom of the recess to a distance slightly below the height of the recess. To facilitate a stick fit engagement of the driver and recess, the taper angle θ of the driver may be constructed slightly larger than the taper angle Φ of the recess, as indicated above.

The above features may be applied with similar results to other straight walled fastener systems. As another embodiment, the spiral drive system of the cited reference Stacy may be improved by constructing an interference interface on the opposing "A" dimension wings and lobes of the recess and driver respectively. This embodiment will not be described further, since its operation and construction can be obtained from the above description.

Figure 16:
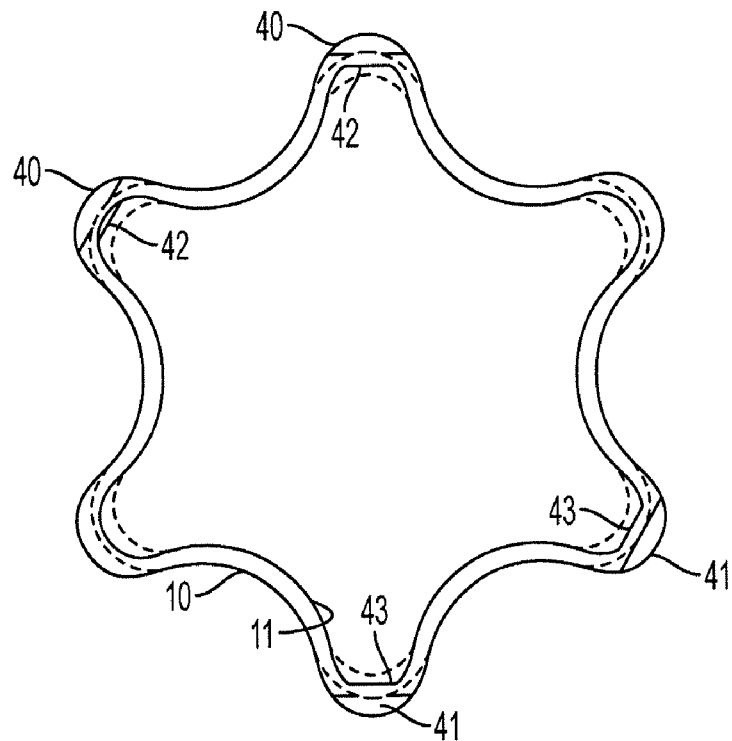
FIG. 16 is a schematic view of a fifth embodiment of the fastener system of FIG. 2 with stick interface surfaces on four lobes and wings.

In the preferred embodiments, the interference contours will be constructed on each of the driver lobe interference contours and each of the recess wing interference contours to avoid the need for an alignment of driver and fastener in a particular relative orientation and to facilitate manufacturing. However, in some applications, it may be advantageous to construct the interference contours on selected pairs of driver lobes and fastener wings with the understanding that some misalignment may commonly occur. This can be avoided to some extent, for example, in the hex lobular configuration, by constructing the interference contours on opposing pairs of wings 40 and 41 and lobes 42 and 43, as shown in FIG. 16. As in FIG. 2, the contour of a standard driver is shown in FIG. 16 in dotted lines where it differs from the contour of the special driver, and the contour of a standard recess is shown in dotted lines where it differs from the contour of the special recess.

Figure 17:
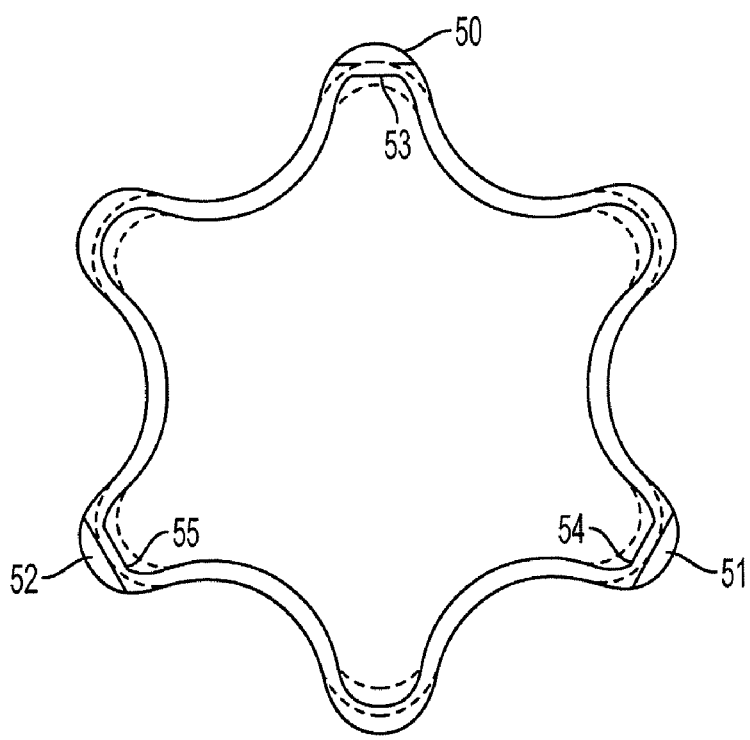
FIG. 17 is a schematic view of a sixth embodiment of the fastener system of FIG. 2 with stick fit interface surfaces on three lobes and wings.
Figure 18:
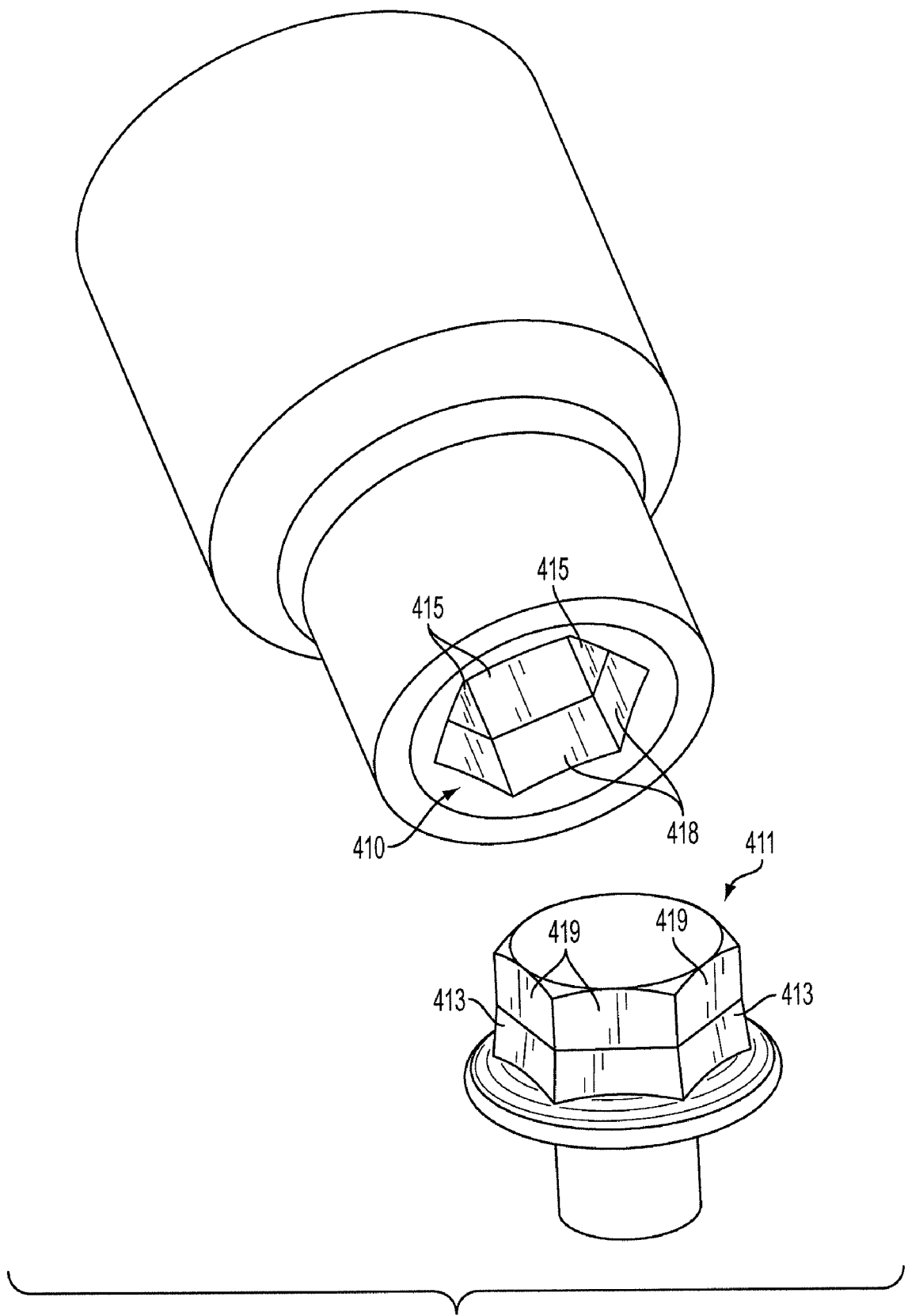
FIGS. 18 through 21 are perspective views of embodiments showing a hex head drive system in which the fastener has external drive surfaces.

In another embodiment of the hex lobular configuration a balanced distribution of interface contours are constructed on three spaced wings 50, 51, and 52 and lobes, 53, 54, and 55, as shown in FIG. 17. This configuration would allow the user to selectively use or not use the stick fit feature by either aligning or not aligning the stick the interfaces of the driver with those of the recess. Alternatively, (not shown), the three interface contours may be spaced asymmetrically, with two in adjacent recess lobes and corresponding driver wings, and the third in a non-adjacent lobe and corresponding wing, to provide engagement of at least one pair of wing and lobe interference contours no matter how the driver is positioned rotationally with respect to the recess upon engagement. As in FIG. 2, the contour of a standard driver is shown in FIG. 17 in dotted lines where it differs from the contour of the special driver, and the contour of a standard recess is shown in dotted lines where it differs from the contour of the special recess.

Figure 14:
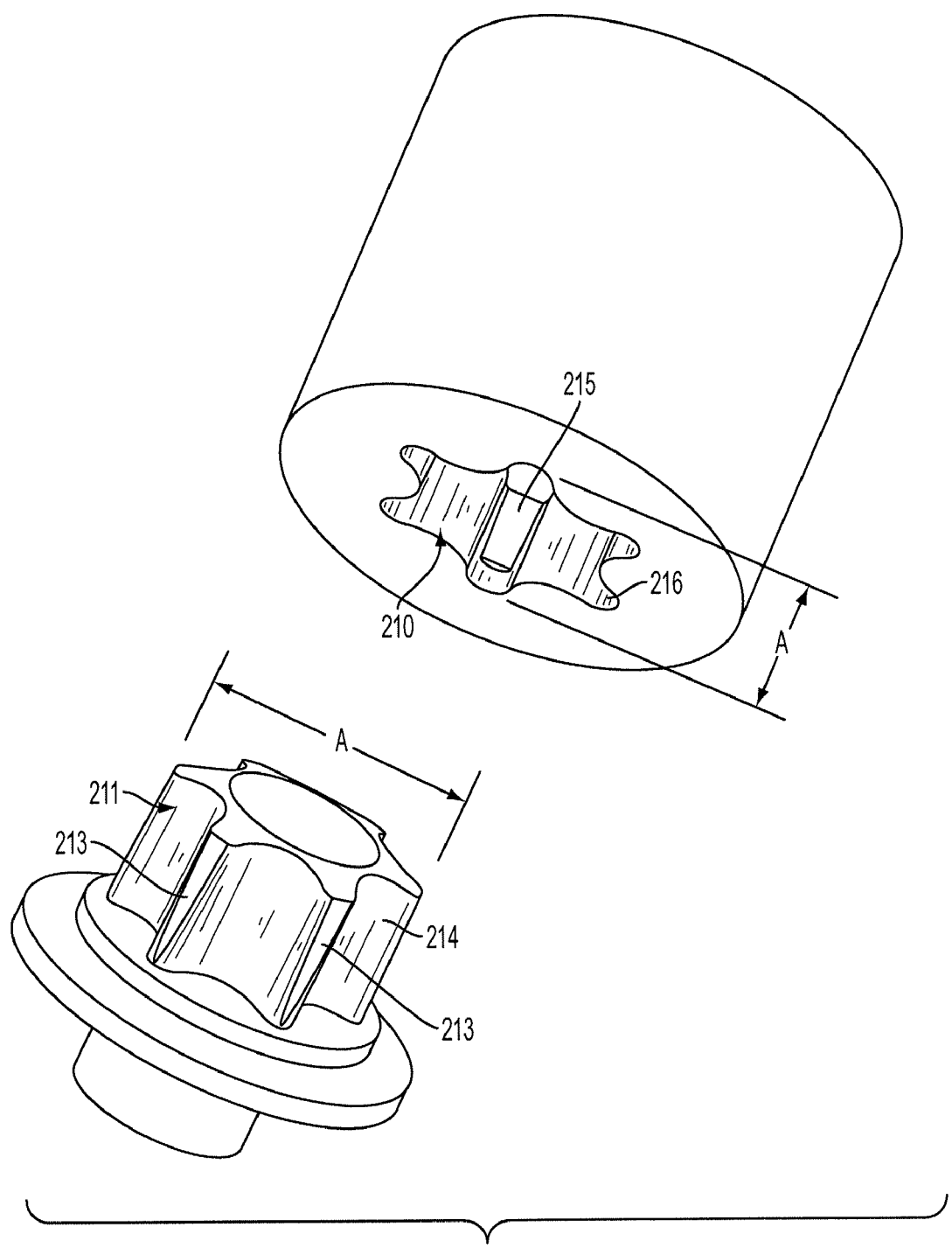
FIG. 14 is a perspective view of a third embodiment showing a hex lobular drive system in which the fastener has external drive surfaces.
Figure 15:
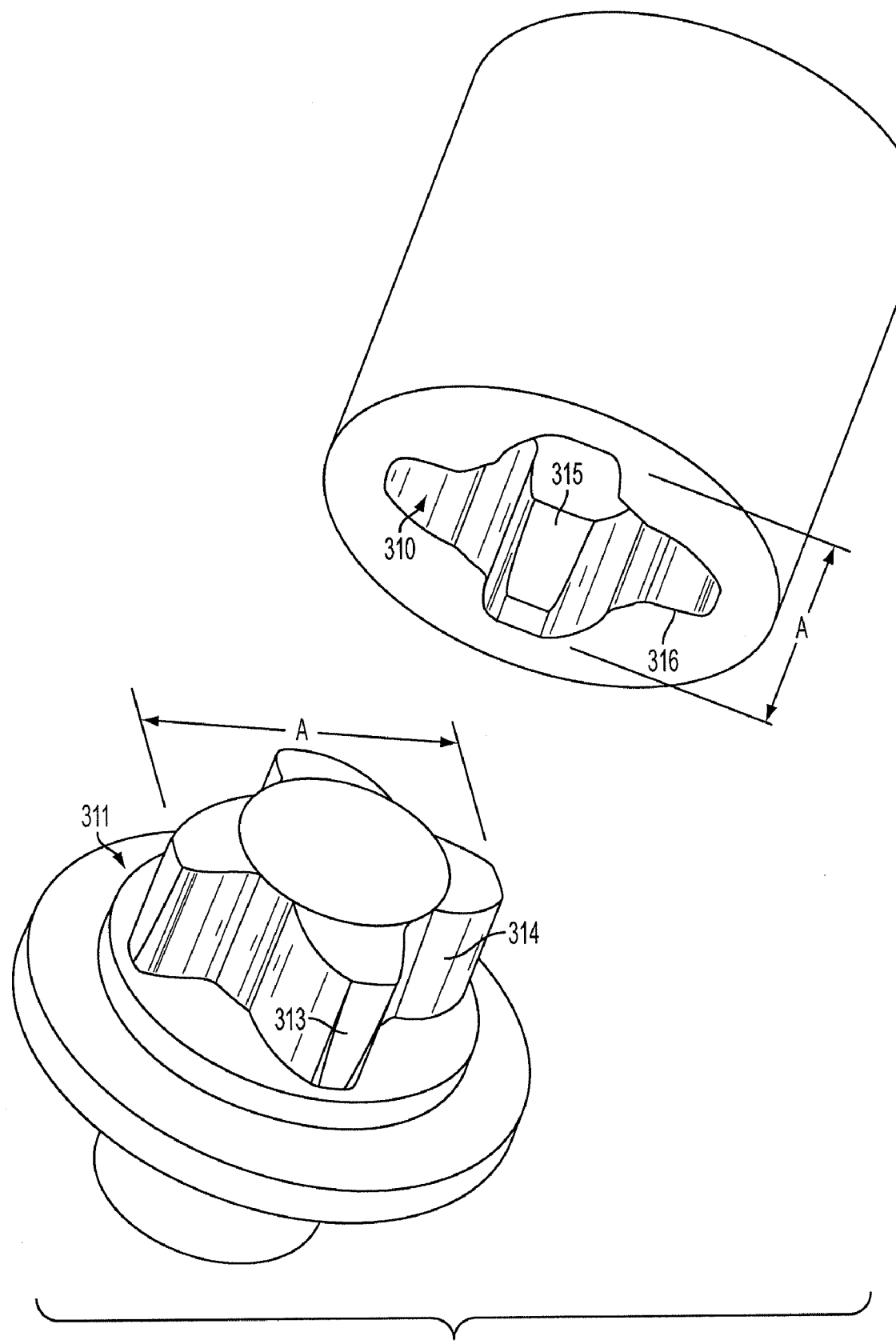
FIG. 15 is a perspective view of a fourth embodiment showing a spiral drive system in which the fastener has external drive surfaces.

The embodiments described above are illustrated as the common form of fastener system involving a female recess on the fastener and a male configured driver. The interference contours of the subject fastener system, however, can be applied as well to the opposite arrangement, as shown in FIGS. 14 and 15. A fastener system having hex lobular, straight walled drive surfaces is shown in FIG. 14. In this embodiment the fastener is constructed having a projection 211 extending axially outward from the fastener head for engagement with a driver 210. The driver 210 is constructed with a female socket having matching drive surfaces for engagement with the drive surfaces of the projection 211. In this embodiment, projection interference contours 213 are constructed on the "A" dimension surface of the lobes 214 of the fastener projection 211 and recess interference surfaces 215 are constructed on the opposing "A" dimension surface of the wings 216 of the driver socket 210.

A further embodiment of an external drive version of the subject fastener system is shown in FIG. 15 in which a spiral drive fastener system is illustrated. In the spiral drive, straight walled fastener system of FIG. 15, a projection 311 is constructed extending axially outward from the fastener head for engagement with a driver socket 310. The driver socket 310 is constructed with matching drive surfaces for engagement with the drive surfaces of the projection 311. In this embodiment, projection interference contours 313 are constructed on the "A" dimension surface of the lobes 314 of the fastener projection 311 and recess interference contours 315 are constructed on the opposing "A" dimension surface of the wings 316 of the driver socket 310. In this manner the alignment stability and reliable stick fit is obtained in an externally driven fastener system.

Figure 19:
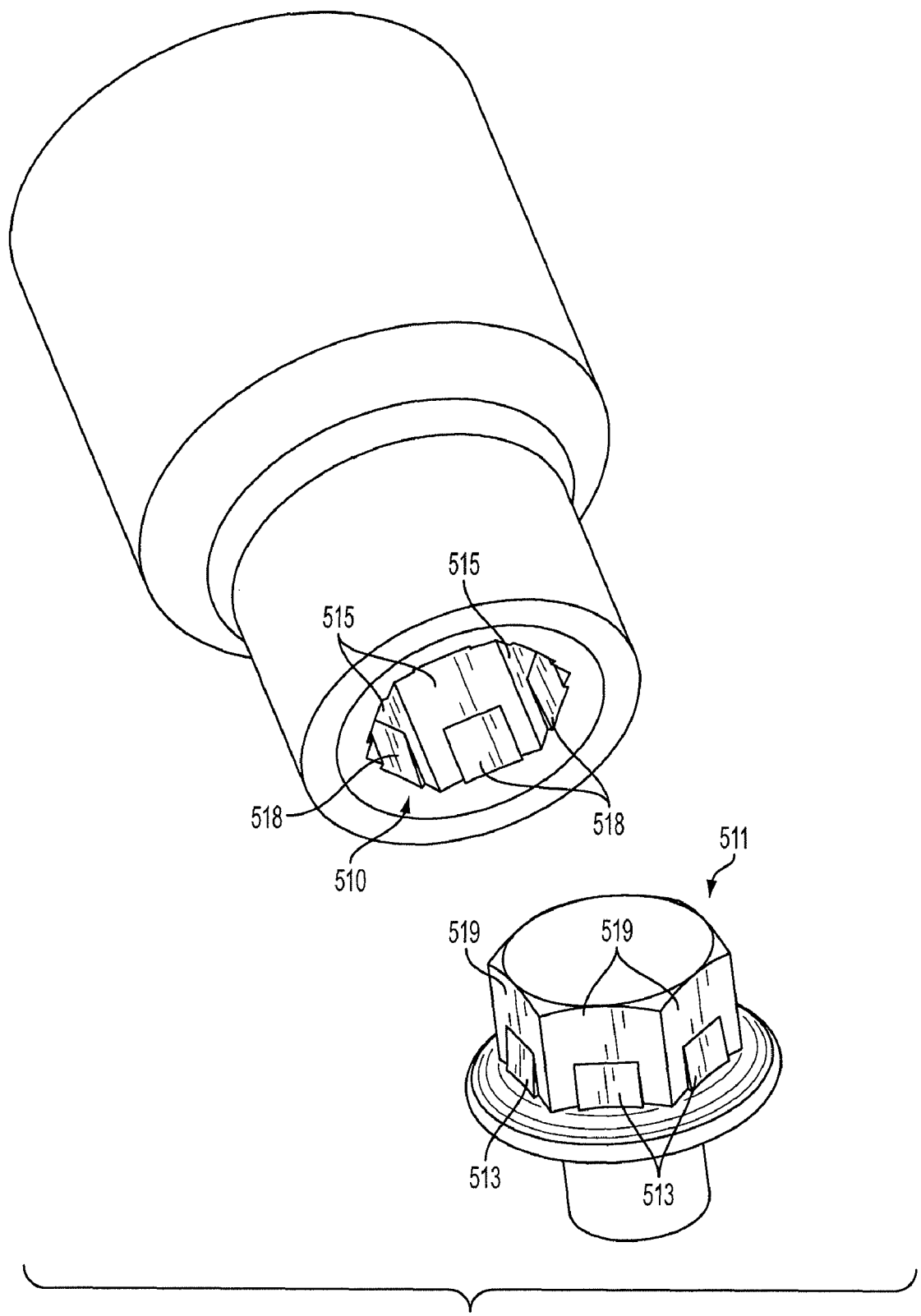
Figure 20:
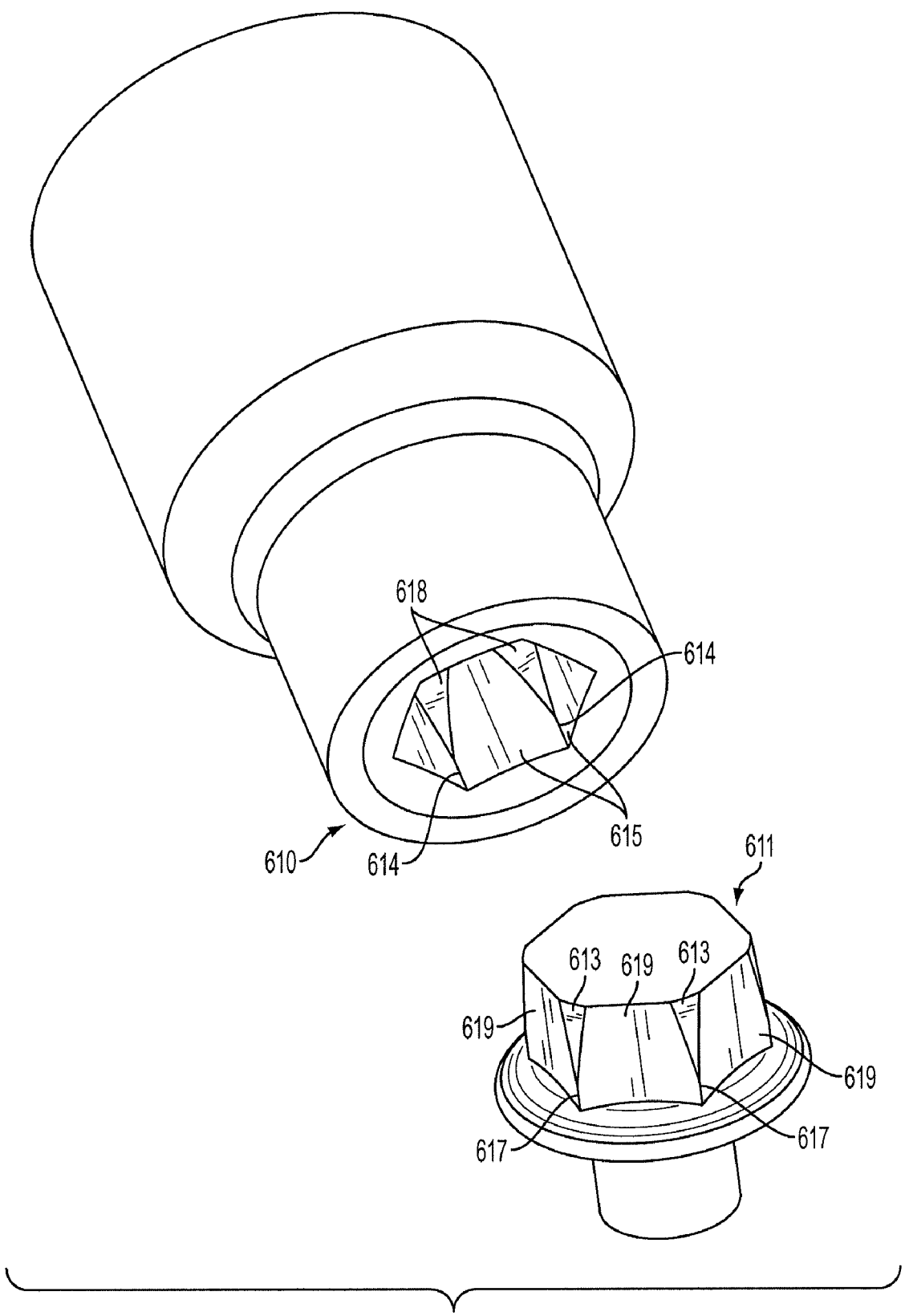

Further embodiments of an external drive fastener system are shown in FIGS. 18 through 21 in which a hex head drive fastener system is illustrated. In the hex head drive, straight walled fastener system of FIG. 18, a projection 411 is constructed extending axially outward from the fastener head for engagement with a driver socket 410. The driver socket 410 is constructed with matching drive surfaces for engagement with the drive surfaces of projection 411. In this embodiment, driver interference contours 413 are constructed on the surface of the sides 419 of the projection 411 and recess interference contours 418 are constructed on the opposing surface of the sides 415 of socket 410. In this manner the alignment stability and reliable stick fit is obtained in an externally driven hex head fastener system. In FIG. 20, the contours 413 are shown positioned at the lower portion of surface 419, however the portions 413 could be positioned higher could be sized to extend over a larger or smaller portion of the surfaces 419, with the contours 518 positioned and sized to match accordingly.

In the hex head drive, straight walled fastener system of FIG. 19, a projection 511 is constructed extending axially outward from the fastener head for engagement with a driver socket 510. The driver socket 510 is constructed with matching drive surfaces for engagement with the drive surfaces of the projection 511. In this embodiment, driver interference contours 513 are constructed on the surface of the sides 519 of the projection 511 and recess interference contours 518 are constructed on the opposing surface of the sides 515 of the socket 510. The system shown in FIG. 19 is similar to that of FIG. 18, however the contours 513 and 518 extend over only a portion of the surfaces 519 and 515, respectively. In FIG. 19, the contours 513 are shown positioned at the lower center portion of the surfaces 519, however the portions 513 could be positioned higher or to one side and/or could be sized to extend over larger or smaller portions of the surfaces 519, with the contours 518 positioned and sized to match accordingly.

In the hex head drive, straight walled fastener system of FIG. 20, a projection 611 is constructed extending axially outward from the fastener head for engagement with a driver socket 610. The driver socket 610 is constructed with matching drive surfaces for engagement with the drive surfaces of the projection 611. In this embodiment, the driver interference contours 613 are constructed on the surface of the sides 619 of the projection 611 at the corners 617 between two adjacent sides 619, and the recess interference contours 618 are constructed on the opposing surfaces of the sides 615 of the socket 610 at the corners 614 between two adjacent sides 615.

Figure 21:
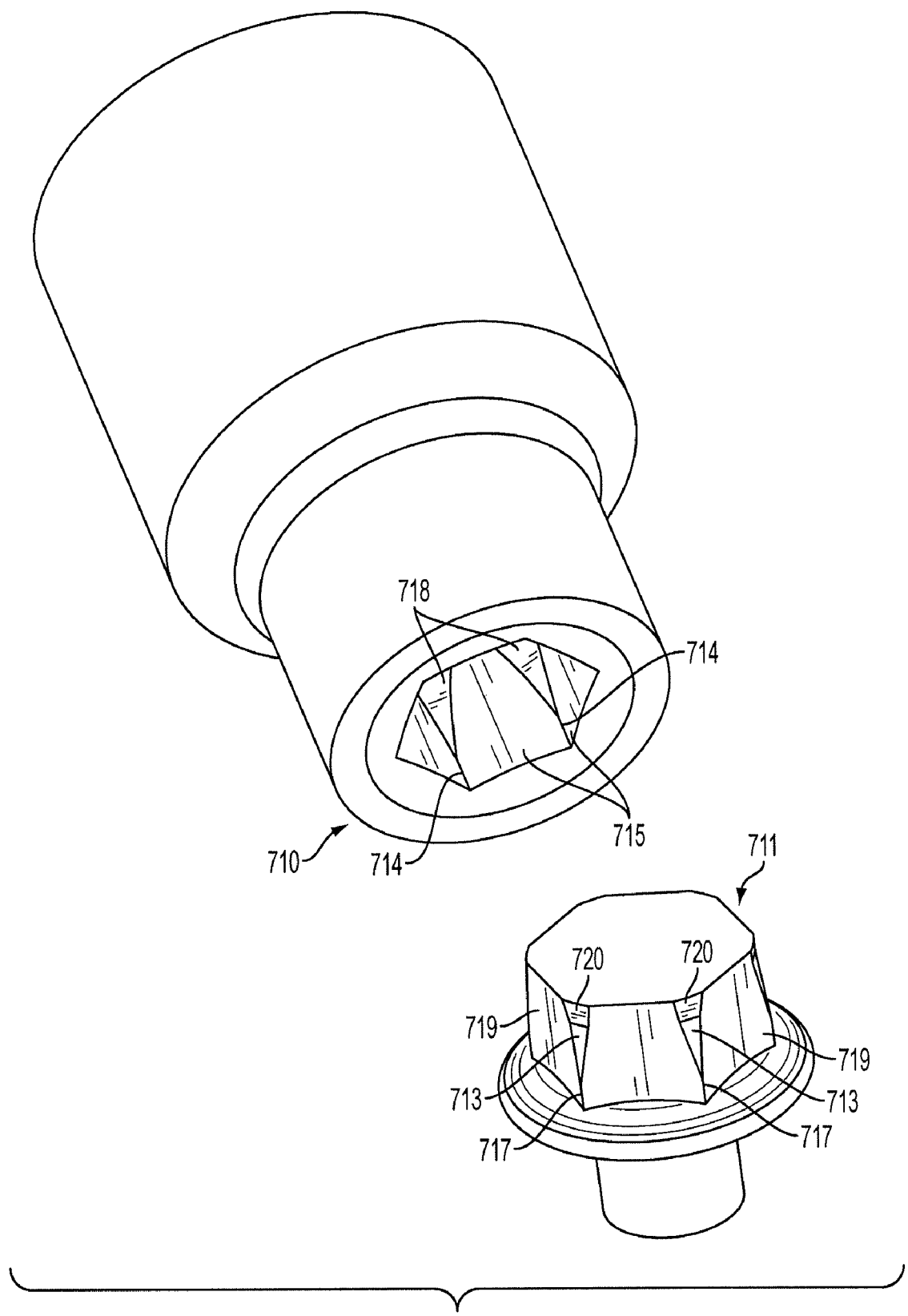

In the hex head drive, straight walled fastener system of FIG. 21, a projection 711 is constructed extending axially outward from the fastener head for engagement with a driver socket 710. The driver socket 710 is constructed with matching drive surfaces for engagement with the drive surfaces of projection 711. In this embodiment, driver interference contours 713 are constructed on the surface of the sides 719 of projection 711 at the corners 717 between two adjacent sides 719, and recess interference contours 718 are constructed on the opposing surface of the sides 715 of socket 710 at the corners 714 between two adjacent sides 715. The system shown in FIG. 21 is similar to that of FIG. 20, however the surface 713 begins its taper at a location below the top of the projection 711, namely, at the bottom of the straight wall portion 720.

The drivers and recesses of the present application may be manufactured in a conventional two-blow header machine. The punch typically will be formed to include a body and a nib that corresponds substantially to the geometry of the driver, illustrated in FIGS. 4 and 10. Punches may be formed according to conventional punch-forming techniques such as use of hobbing dies. Drivers in accordance with the invention also can be manufactured using conventional techniques, such as by stamping a driver blank with one or more shaped dies to form the desired shape wings or, by milling the driver bit using specially shaped milling cutters.

The above description and drawings are only to be considered illustrative of specific embodiments, which achieve the features and advantages described herein. Modifications and substitutions for specific conditions and materials can be made. Accordingly, the embodiments are not considered as being limited by the foregoing description and drawings, but is only limited by the scope of the appended claims.

What is claimed as new and desired to be protected by Letters Patent of the United States is:

1. A fastener system comprising:
   a fastener having a head and a shank, the fastener having a central longitudinal axis, wherein the head is constructed having a central portion and a plurality of wings radiating outwardly from the central portion, each of the wings having an installation driving surface and a removal driving surface, separated by a non-driving transition contour, the non-driving transition contour forming the radially outward-most portion of the wing, and wherein the driving surfaces are constructed in substantially parallel alignment with the central longitudinal axis of the fastener;
   a driver having a bit end, the driver having a central longitudinal axis, wherein the bit end is constructed having a central portion and a plurality of lobes radiating outwardly from the central portion, each of the lobes having an installation driving surface and a removal driving surface, separated by a non-driving transition contour, the non-driving transition contour forming the radially outward most portion of the lobe, and wherein the driving surfaces of the lobes are constructed in parallel alignment with the central longitudinal axis;
   an interference interface further including:
      a first interference contour formed in at least one of the non-driving transition contours of the fastener wings to present a first tapered interface surface; and
      a second interference contour formed in at least one of the non-driving transition contours of the driver bit end lobes to present a second tapered interface surface; and
   further wherein the driving surfaces of the fastener head are constructed to receive the driving surfaces of the driver bit end in a mated engagement and the first and second interface surfaces are constructed to form a frictional engagement when the fastener head and driver bit end are in the mated engagement,
   wherein the driving surfaces of the fastener head are constructed in a recess extending into the fastener head, and the recess is adapted to receive the driving surfaces of the bit end, and
   wherein the first and second interface surfaces are tapered at first and second angles respectively and wherein the first angle is larger than the second angle.

2. The fastener system according to claim 1, wherein the first and second interference contours are formed in each of the non-driving transition contours of the fastener wings and the driver bit end lobes to present a first and a second tapered interface surface at each of the non-driving transition contours of the fastener wings and the driver bit end lobes.

3. The fastener system according to claim 1, wherein the first and second interference contours are formed in three of the non-driving transition contours of the fastener wings and the driver bit end lobes to present a first and a second tapered interface surface at each of the three non-driving transition contours of the fastener wings and the driver bit end lobes.

4. The fastener system according to claim 3, wherein the three contours are spaced in matched symmetry around the respective geometries.

5. The fastener system according to claim 1, wherein the first and second interface contours are formed in two pairs, totaling four, of the non-driving transition contours of the fastener wings and the driver bit end lobes to present a first and a second tapered interface surface at each of the four non-driving transition contours of the fastener wings and the driver bit end lobes, the four contours being spaced in matched opposing positions around the respective geometries.

6. The fastener system according to claim 1, wherein the dimensions of the recess are enlarged to enable the enlarged recess to receive a standard driver bit end without binding on the first or second interface surfaces.

7. The fastener system according to claim 1, wherein the first and second angles are in the range of about one degree (1°) to about three degrees (3°).

8. The fastener system according to claim 1, wherein the distance across the recess from one transition contour to an opposite transition contour comprises the "A" dimension of the fastener and the recess is enlarged by extending the "A" dimension.

9. The fastener system according to claim 1, wherein the wings and lobes are configured in a hex lobular form.

10. The fastener system according to claim 1, wherein the wings and lobes are configured with driving surfaces constructed in the form of a segment of a spiral.

11. The fastener system according to claim 1, wherein the first interference contour is formed in the non-driving transition contour of the fastener wings starting at a point slightly below the top of the recess and extending to the bottom of the recess.

12. The fastener system according to claim 1, wherein the first and second interference contours are formed with mating curvatures.

13. The fastener system according to claim 12, wherein the first and second interference contours are formed with mating curvatures and the mating curvatures have a radius of curvature that is large enough to provide a substantially flat interface.

14. The fastener system according to claim 1, wherein the first angle is about one half degree (0.5°) larger than the second angle.

15. The fastener system according to claim 1, wherein the first and second angles are in the range of about one half degree (0.5°) to about seven degrees (7°).

16. A method of constructing a fastener system comprising:
   forming a fastener having a head and a shank, the fastener having a central longitudinal axis, wherein the head is constructed having a central portion and a plurality of wings radiating outwardly from the central portion, each of the wings having an installation driving surface and a removal driving surface, separated by a non-driving transition contour, the non-driving transition contour forming the radially outward-most portion of the wing, and wherein the driving surfaces are constructed substantially in parallel alignment with the central longitudinal axis of the fastener;
   forming a driver having a bit end the driver having a central longitudinal axis, wherein the bit end is constructed having a central portion and a plurality of lobes radiating outwardly from the central portion, each of the lobes having an installation driving surface and a removal driving surface, separated by a non-driving transition contour, the non-driving transition contour forming the radially outward most portion of the lobe, and wherein the driving surfaces of the lobes are constructed in parallel alignment with the central longitudinal axis;
   forming an interference interface further including:
      a first interference contour formed in at lease one of the non-driving transition contours of the fastener wings to present a first tapered interface surface; and
      a second interference contour formed in at least one of the non-driving transition contours of the driver bit end lobes to present a second tapered interface surface; and
   further wherein the driving surfaces of the fastener head are constructed to receive the driving surfaces of the driver bit end in a mated engagement and the first and second interface surfaces are constructed to form a frictional engagement when the fastener head and driver bit end are in the mated engagement,
   wherein the driving surfaces of the fastener head are constructed in a recess extending into the fastener head, the recess is adapted to receive the driving surfaces of the bit end, and
   wherein the first and second interface surfaces are tapered at first and second angles respectively and wherein the first angle is larger than the second angle.

17. The method of constructing a fastener system according to claim 16, wherein the dimensions of the recess are enlarged to enable the enlarged recess to receive a standard driver bit end without binding on the first or second interface surfaces.

18. The method of constructing a fastener system according to claim 16, wherein the first and second angles are in the range of about one degree (1°) to about three degrees (3°).

19. The method of constructing a fastener system according to claim 16, wherein the distance across the recess from one transition contour to an opposite transition contour comprises the "A" dimension of the fastener and the recess is enlarged by extending the "A" dimension.

20. The method of constructing a fastener system according to claim 16, wherein the wings and lobes are configured in a hex lobular form.

21. The method of constructing a fastener system according to claim 16, wherein the wings and lobes are configured with driving surfaces constructed in the form of a segment of a spiral.

22. The method of constructing a fastener system according to claim 16, wherein the first interference contour is formed in the non-driving transition contour of the fastener wings starting at a point slightly below the top of the recess and extending to the bottom of the recess.

23. The method of constructing a fastener according to claim 16, wherein the first and second interference contours are formed with mating curvatures.

24. The method according to claim 23, wherein the first and second interference contours are constructed having a radius of curvature that is large enough to provide a substantially flat interface.

25. The method according to claim 16, wherein the first and second interference contours are constructed with the driver "A" dimension having a positive tolerance of plus zero (+0) to plus two thousandths (+0.002) inch, and the recess "A" dimension having a negative tolerance of minus zero (−0) to minus two thousandths (−0.002) inch.

26. The method according to claim 16, wherein the first and second interface contours are formed in each of the non-driving transition contours of the fastener wings and the driver bit end lobes to present a first and a second tapered interface surface at each of the non-driving transition contours of the fastener wings and the driver bit end lobes.

27. The method according to claim 16, wherein the first and second interface contours are formed in three of the non-driving transition contours of the fastener wings and the driver bit end lobes to present a first and a second tapered interface surface at each of the three non-driving transition contours of the fastener wings and the driver bit end lobes.

28. The fastener system according to claim 27, wherein the three non-driving transition contours of the fastener wings and the driver bit end lobes are spaced in matched symmetry around the respective geometries.

29. The method according to claim 16, wherein the first and second interface contours are formed in two pairs, totaling four, of the non-driving transition contours of the fastener wings and the driver bit end lobes to present a first and a second tapered interface surface at each of the four non-driving transition contours of the fastener wings and the driver bit end lobes, the four contours being spaced in matched opposing positions around the respective geometries.

30. The method of constructing a fastener system according to claim 16, wherein the first angle is about one half degree (0.5°) larger than the second angle.

31. The method of constructing a fastener system according to claim 16, wherein the first and second angles are in the range of about one half degree (0.5°) to about seven degrees (7°).

32. The method of constructing a fastener system according to claim 16, wherein the first and second interference contours are constructed with: the first angle having a tolerance of plus one quarter degree (+0.25°), minus zero degree (−0.0°); and the second angle having a tolerance of, plus zero degree (+0.0°), minus one quarter degree (−0.25°).

33. A fastener comprising:
a head and a shank having a central longitudinal axis, wherein the head is constructed having a central portion and a plurality of wings radiating outwardly from the central portion, each of the wings having an installation driving surface and a removal driving surface, separated by a non-driving transition contour, the non-driving transition contour forming the radially outward-most portion of the wing, and wherein the driving surfaces are constructed in substantially parallel alignment with the central longitudinal axis of the fastener; and
a wedge formed in the non-driving transition contour of the fastener wings to present a tapered interface surface,
wherein the interface surface is tapered at an angle in the range of about one degree (1°) to about three degrees (3°).

34. The fastener according to claim 33, wherein the driving surfaces of the fastener head are constructed to receive the driving surfaces of a driver bit end in a mated engagement.

35. The fastener according to claim 34, and the tapered interface surface is constructed to form a frictional engagement with the driver bit end.

36. The fastener according to claim 33, wherein the driving surfaces of the fastener head are constructed in a recess extending into the fastener head the recess is adapted to receive the driving surfaces of a driver bit end.

37. The fastener according to claim 36, wherein the dimensions of the recess are enlarged to enable the enlarged recess to receive a standard driver bit end without binding on the interface surface.

38. A fastener system comprising:
a fastener having a head and a shank, the fastener having a central longitudinal axis, wherein the head is constructed having drive surfaces for installation and removal, and wherein the fastener drive surfaces are constructed in substantially parallel alignment with the central longitudinal axis of the fastener;
a driver having a bit end, the driver having a central longitudinal axis, wherein the bit end is constructed having drive surfaces for installation and removal, and wherein the driver drive surfaces are constructed in parallel alignment with the central longitudinal axis;
an interference interface further including:
a first interference contour formed in at least one of the fastener drive surfaces to present a first tapered interface surface; and
a second interference contour formed in at least one of the driver drive surfaces to present a second tapered interface surface; and
further wherein the driving surfaces of the fastener head are constructed to receive the driving surfaces of the driver bit end in a mated engagement and the first and second interface surfaces are constructed to form a frictional engagement when the fastener head and driver bit end are in the mated engagement,
wherein the driving surfaces of the fastener head are constructed in a recess extending into the fastener head, and the recess is adapted to receive the driving surfaces of the bit end, and
wherein the first and second interface surfaces are tapered at first and second angles respectively and wherein the first angle is larger than the second angle.

39. The fastener system according to claim 38, wherein the driving surfaces are configured in a hex form.

40. The fastener system according to claim 39, wherein the first and second interface contours are formed in each of the drive surfaces of the fastener and the driver bit to present a first and a second tapered interface surface at each of the drive surfaces of the fastener and the driver bit.

41. The fastener system according to claim 39, wherein the driving surfaces of the driver bit end are constructed in a socket extending into the bit.

42. The fastener system according to claim 38, wherein the first and second angles are in the range of about one degree (1°) to about three degrees (3°).

43. The fastener system according to claim 38, wherein the first and second interference contours are formed with mating curvatures.

44. The fastener system according to claim 43, wherein the first and second interference contours provide a substantially flat interface.

45. The fastener system according to claim 38, wherein the first angle is about one half degree (0.5°) larger than the second angle.

46. The fastener system according to claim 38, wherein the first and second angles are in the range of about one half degree (0.5°) to about seven degrees (7°).

47. A method of constructing a fastener system comprising:
a fastener having a head and a shank, the fastener having a central longitudinal axis, wherein the head is constructed having drive surfaces for installation and removal, and wherein the fastener drive surfaces are constructed in substantially parallel alignment with the central longitudinal axis of the fastener;
a driver having a bit end, the driver having a central longitudinal axis, wherein the bit end is constructed having drive surfaces for installation and removal, and wherein the driver drive surfaces are constructed in parallel alignment with the central longitudinal axis;
an interference interface further including:
a first interference contour formed in at least one of the fastener drive surfaces to present a first tapered interface surface; and
a second interference contour formed in at least one of the driver drive surfaces to present a second tapered interface surface; and
further wherein the driving surfaces of the fastener head are constructed to receive the driving surfaces of the driver bit end in a mated engagement and the first and second interface surfaces are constructed to form a frictional engagement when the fastener head and driver bit end are in the mated engagement, and
wherein the first and second interface surfaces are tapered at first and second angles respectively and wherein the first angle is larger than the second angle.

48. The method of constructing a fastener system according to claim 47, wherein the driving surfaces are configured in a hex form.

49. The method of constructing a fastener system according to claim 48, wherein the driving surfaces of the driver bit end are constructed in a socket extending into the bit.

50. The method of constructing a fastener system according to claim 48, wherein the first and second interface contours are formed in each of the drive surfaces of the fastener and the driver bit to present a first and a second tapered interface surface at each of the drive surfaces of the fastener and the driver bit.

51. The method of constructing a fastener system according to claim 47, wherein the first and second angles are in the range of about one degree (1°) to about three degrees (3°).

52. The method of constructing a fastener system according to claim 47, wherein the first and second interference contours are formed with mating curvatures.

53. The method of constructing a fastener system according to claim 52, wherein the first and second interference contours provide a substantially flat interface.

54. The method of constructing a fastener system according to claim 47, wherein the first angle is about one half degree (0.5°) larger than the second angle.

55. The method of constructing a fastener system according to claim 47, wherein the first and second angles are in the range of about one half degree (0.5°) to about seven degrees (7°).

56. The method of constructing a fastener system according to claim 47, wherein the first and second interference contours are constructed with: the first angle having a tolerance of plus one quarter degree (+0.25°), minus zero degree (−0.0°); and the second angle having a tolerance of, plus zero degree (+0.0°), minus one quarter degree (−0.25°).

57. A punch for forming the head end of a recessed head fastener comprising:
a body having a face configured to form and defined the outer contour of the head;
a nib integral with the body and extending from the face, the nib having a central longitudinal axis, wherein the nib is constructed having a central portion and a plurality of wings radiating outwardly from the central portion, each of the wings having a surface configured to form an installation driving surface and a removal driving surface, separated by a non-driving transition contour, the non-driving transition contour forming the radially outward-most portion of the wing, and wherein the driving surfaces are constructed in substantially parallel alignment with the central longitudinal axis; and
a wedge formed in the non-driving transition contour of the wings to present a tapered interface surface,
wherein the interface surface is tapered at an angle in the range of about one degree (1°) to about three degrees (3°).

58. The punch according to claim 57, wherein the dimensions of the nib are enlarged to form the enlarged recess to receive a standard driver bit end without binding on the interface surface.

59. A fastener system comprising:
a fastener having a head and a shank, the fastener having a central longitudinal axis, wherein the head is constructed having a central portion and a plurality of wings radiating outwardly from the central portion, each of the wings having an installation driving surface and a removal driving surface, separated by a non-driving transition contour, the non-driving transition contour forming the radially outward-most portion of the wing, and wherein the driving surfaces are constructed in substantially parallel alignment with the central longitudinal axis of the fastener;
a driver having a bit end, the driver having a central longitudinal axis, wherein the bit end is constructed having a central portion and a plurality of lobes radiating outwardly from the central portion, each of the lobes having an installation driving surface and a removal driving surface, separated by a non-driving transition contour, the non-driving transition contour forming the radially outward most portion of the lobe, and wherein the driving surfaces of the lobes are constructed in parallel alignment with the central longitudinal axis;
an interference interface further including:
a first interference contour formed in at least one of the non-driving transition contours of the fastener wings to present a first tapered interface surface; and
a second interference contour formed in at least one of the non-driving transition contours of the driver bit end lobes to present a second tapered interface surface; and
further wherein the driving surfaces of the fastener head are constructed to receive the driving surfaces of the driver bit end in a mated engagement and the first and second interface surfaces are constructed to form a frictional engagement when the fastener head and driver bit end are in the mated engagement,
wherein the driving surfaces of the driver bit end are constructed in a socket extending into the bit and further wherein the dimensions of the socket are enlarged to enable the enlarged socket to receive standard driving surfaces without binding on the first or second interference surfaces, and
wherein the first and second interface surfaces are tapered at first and second angles respectively and wherein the second angle is larger than the first angle.

60. A fastener system comprising:
a fastener having a head and a shank, the fastener having a central longitudinal axis, wherein the head is constructed having drive surfaces for installation and removal, and wherein the fastener drive surfaces are constructed in substantially parallel alignment with the central longitudinal axis of the fastener;
a driver having a bit end, the driver having a central longitudinal axis, wherein the bit end is constructed having drive surfaces for installation and removal, and wherein the driver drive surfaces are constructed in parallel alignment with the central longitudinal axis;
an interference interface further including:
a first interference contour formed in at least one of the fastener drive surfaces to present a first tapered interface surface; and
a second interference contour formed in at least one of the driver drive surfaces to present a second tapered interface surface; and
further wherein the driving surfaces of the fastener head are constructed to receive the driving surfaces of the driver bit end in a mated engagement and the first and second interface surfaces are constructed to form a frictional engagement when the fastener head and driver bit end are in the mated engagement,
wherein the driving surfaces of the fastener head are constructed on a projection extending from the fastener head, and the projection is adapted to receive the driving surfaces of the bit end, and wherein the first and second interface surfaces are tapered at first and second angles respectively and wherein the second angle is larger than the first angle.

61. The fastener system according to claim 60, wherein the first interference contour is formed in the at least one fastener drive surface starting at a point below the top of the projection and extending to the bottom of the projection.

62. The fastener system according to claim 60, wherein the first interference contour is formed in the at least one fastener drive surface starting at a point about halfway between the top and bottom of the projection and extending to the bottom of the projection.

63. The fastener system according to claim 60, wherein the first interference contour is formed in a lower center portion of the at least one fastener drive surface starting at a point below the top of the projection and extending to the bottom of the projection.

64. The fastener system according to claim 60, wherein the first interference contour is formed in at least one corner formed by adjoining fastener drive surfaces.

65. The fastener system according to claim 60, wherein the first interference contour is formed in at least one corner formed by adjoining fastener drive surfaces starting at a point at the top of the projection and extending to a point above the bottom of the projection.

66. The fastener system according to claim 60, wherein the first interference contour is formed in at least one corner formed by adjoining fastener drive surfaces starting at a point below the top of the projection and extending to a point above the bottom of the projection.

67. A method of constructing a fastener system comprising:
   a fastener having a head and a shank, the fastener having a central longitudinal axis, wherein the head is constructed having drive surfaces for installation and removal, and wherein the fastener drive surfaces are constructed in substantially parallel alignment with the central longitudinal axis of the fastener;
   a driver having a bit end, the driver having a central longitudinal axis, wherein the bit end is constructed having drive surfaces for installation and removal, and wherein the driver drive surfaces are constructed in parallel alignment with the central longitudinal axis;
   an interference interface further including:
      a first interference contour formed in at least one of the fastener drive surfaces to present a first tapered interface surface; and
      a second interference contour formed in at least one of the driver drive surfaces to present a second tapered interface surface; and
   further wherein the driving surfaces of the fastener head are constructed to receive the driving surfaces of the driver bit end in a mated engagement and the first and second interface surfaces are constructed to form a frictional engagement when the fastener head and driver bit end are in the mated engagement,
   wherein the driving surfaces of the fastener head are constructed on a projection extending from the fastener head, and the projection is adapted to receive the driving surfaces of the bit end, and
   wherein the first and second interface surfaces are tapered at first and second angles respectively and wherein the second angle is larger than the first angle.

68. The method of constructing a fastener system according to claim 67, wherein the first interference contour is formed in the at least one fastener drive surface starting at a point below the top of the projection and extending to the bottom of the projection.

69. The method of constructing a fastener system according to claim 67, wherein the first interference contour is formed in the at least one fastener drive surface starting at a point about halfway between the top and bottom of the projection and extending to the bottom of the projection.

70. The method of constructing a fastener system according to claim 67, wherein the first interference contour is formed in a lower center portion of the at least one fastener drive surface starting at a point below the top of the projection and extending to the bottom of the projection.

71. The method of constructing a fastener system according to claim 67 wherein the first interference contour is formed in at least one corner formed by adjoining fastener drive surfaces.

72. The method of constructing a fastener system according to claim 67, wherein the first interference contour is formed in at least one corner formed by adjoining fastener drive surfaces starting at a point at the top of the projection and extending to a point above the bottom of the projection.

73. The method of constructing a fastener system according to claim 67, wherein the first interference contour is formed in at least one corner formed by adjoining fastener drive surfaces starting at a point below the top of the projection and extending to a point above the bottom of the projection.

* * * * *